US009128361B2

United States Patent
Yanagisawa et al.

(10) Patent No.: US 9,128,361 B2
(45) Date of Patent: Sep. 8, 2015

(54) LIQUID-COOLING DEVICE AND PROJECTOR

(71) Applicant: Seiko Epson Corporation, Tokyo (JP)

(72) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/310,577

(22) Filed: Jun. 20, 2014

(65) Prior Publication Data

US 2014/0300871 A1 Oct. 9, 2014

Related U.S. Application Data

(63) Continuation of application No. 12/406,555, filed on Mar. 18, 2009, now Pat. No. 8,794,767.

(30) Foreign Application Priority Data

Mar. 24, 2008 (JP) .................................. 2008-076787
Nov. 7, 2008 (JP) .................................. 2008-286777

(51) Int. Cl.
*G03B 21/18* (2006.01)
*G03B 21/16* (2006.01)
(Continued)

(52) U.S. Cl.
CPC ................ *G03B 21/16* (2013.01); *F25B 21/02* (2013.01); *F25B 2321/0252* (2013.01); *F28D 15/00* (2013.01)

(58) Field of Classification Search
CPC ...... H04N 9/3144; G03B 21/16; F25B 21/02; G02F 1/133385; G06F 2200/201
USPC .......................................... 353/52, 57–61, 54
See application file for complete search history.

(56) References Cited

U.S. PATENT DOCUMENTS 5,097,829 A * 3/1992 Quisenberry ................. 607/105
5,964,092 A 10/1999 Tozuka et al.
(Continued)

FOREIGN PATENT DOCUMENTS

CN       2891005 Y     4/2007
CN     101090627 A    12/2007
(Continued)

OTHER PUBLICATIONS

Non-Final Office Action received in U.S. Appl. No. 12/406,555; May 13, 2011.
(Continued)

*Primary Examiner* — Sultan Chowdhury
*Assistant Examiner* — Danell L Owens
(74) *Attorney, Agent, or Firm* — ALG Intellectual Property, LLC

(57) ABSTRACT

In at least one embodiment of the disclosure, a projector comprises an optical element holding member that allows a flow of a cooling liquid therein. A plurality of liquid circulation members connect the optical element holding member and a liquid pumping unit and to define a flow channel of the cooling liquid. A heat-receiving jacket is disposed in the flow channel and has a plurality of flow channels. A thermoelectric conversion element having a heat-absorbing surface is connected to the heat-receiving jacket and a heat-radiating surface is connected to a heat transfer member. A supporting member fixes the heat-receiving jacket and the heat transfer member. A baffle member defines an internal space with the supporting member and houses the heat transfer member in the internal space. A cooling fan provides cooling air to the heat transfer member disposed in the internal space.

19 Claims, 16 Drawing Sheets

(51) Int. Cl.
*F25B 21/02* (2006.01)
*F28D 15/00* (2006.01)

(56) References Cited

U.S. PATENT DOCUMENTS

| | | | |
|---|---|---|---|
| 7,264,359 | B2 | 9/2007 | Kawahara et al. |
| 7,535,543 | B2 | 5/2009 | Dewa et al. |
| 2002/0191158 | A1 | 12/2002 | Koyama et al. |
| 2005/0000559 | A1 | 1/2005 | Horio et al. |
| 2005/0117077 | A1 | 6/2005 | Utsunomiya |
| 2005/0168703 | A1* | 8/2005 | Fujimori et al. ............... 353/52 |
| 2005/0249852 | A1 | 11/2005 | Smith |
| 2006/0244926 | A1 | 11/2006 | Shih et al. |
| 2007/0291234 | A1 | 12/2007 | Momose et al. |
| 2008/0062641 | A1* | 3/2008 | Lai et al. ...................... 361/695 |

FOREIGN PATENT DOCUMENTS

| | | |
|---|---|---|
| JP | 03-288187 A | 12/1991 |
| JP | 04-073733 A | 3/1992 |
| JP | 2005-202330 A | 7/2005 |
| JP | 2005-300096 A | 10/2005 |
| JP | 2006-171300 A | 6/2006 |
| JP | 2006-243123 A | 9/2006 |
| JP | 2006-330642 A | 12/2006 |
| JP | 2006-343498 A | 12/2006 |
| JP | 2007-025384 A | 2/2007 |
| JP | 2007-41412 A | 2/2007 |
| JP | 2007183167 A | 7/2007 |
| WO | WO-2004-107837 A | 12/2004 |

OTHER PUBLICATIONS

Final Office Action received in U.S. Appl. No. 12/406,555; Oct. 24, 2011.
Non-Final Office Action received in U.S. Appl. No. 12/406,555; Jan. 6, 2012.
Final Office Action received in U.S. Appl. No. 12/406,555; Jun. 27, 2012.
Non-Final Office Action received in U.S. Appl. No. 12/406,555; Jun. 12, 2013.
Final Office Action received in U.S. Appl. No. 12/406,555; Dec. 27, 2013.
Notice of Allowance and Notice of Allowability received in U.S. Appl. No. 12/406,555; Mar. 20, 2014.

* cited by examiner

LIQUID-COOLING DEVICE AND PROJECTOR

CROSS-REFERENCE

The present application is a continuation of U.S. patent application Ser. No. 12/406,555 filed Mar. 18, 2009, which claims priority from Japanese Patent Application No. 2008-076787 filed on Mar. 24, 2008 and Japanese Patent Application No. 2008-286777 filed on Nov. 7, 2008, which are hereby expressly incorporated by reference in their entirety.

BACKGROUND

A projector having a light source, a light modulator configured to form an image light by modulating a luminous flux emitted from the light source according to image data, and a projection optical device configured to project the image light in an enlarged scale is known.

In the projector of this type, a configuration to cool optical elements such as the light modulator with cooling liquid is proposed (see, for example, JP-A-2007-41412).

The projector disclosed in JP-A-2007-41412 includes an optical element holding member which allows the cooling liquid to flow and holds the optical element, a liquid pumping unit which forces the cooling liquid to circulate, and a radiator in the interior thereof. The members as described above are connected by a plurality of liquid circulation members, whereby an annular flow channel which allows the cooling liquid to circulate is formed. The heat generated in the optical element is transferred to the cooling liquid via the optical element holding member. The heat transferred to the cooling liquid is radiated when the cooling liquid flows in the radiator.

However, with the projector disclosed in JP-A-2007-41412, since the radiator is employed as a device for radiating heat of the cooling liquid, it is difficult to lower the temperature of the cooling liquid effectively. In other words, since the optical element is cooled with the cooling liquid at a relatively high temperature, it is difficult to cool the optical element effectively.

SUMMARY

Various embodiments of the disclosure provide a projector which is capable of cooling an optical element effectively.

A projector according to at least one embodiment includes a liquid-cooling device for cooling an optical element by cooling liquid, in which the liquid-cooling device includes an optical element holding member configured to allow flow of the cooling liquid therein and hold the optical element so as to be capable of transferring heat to the cooling liquid. A liquid pumping unit is configured to suck and pump the cooling liquid. A plurality of liquid circulation members are configured to connect the optical element holding member and the liquid pumping unit to define a flow channel of the cooling liquid, and also includes a thermoelectric conversion element having a heat-absorbing surface and a heat-radiating surface and being connected to the liquid-cooling device in a state of being capable of transferring heat from the cooling liquid to the heat-absorbing surface.

In certain embodiments, the projector is provided with a thermoelectric conversion element such as a Peltier element connected to the liquid-cooling device in a state in which the heat-absorbing surface is capable of transferring heat from the cooling liquid, heat of the cooling liquid circulating along the flow channel may be effectively absorbed from the heat-absorbing surface, thereby effectively lowering the temperature of the cooling liquid. As such, the optical element may be cooled with the cooling liquid at a sufficiently low temperature, and hence effective cooling of the optical element may be achieved. Therefore, thermal degradation of the optical element may be avoided, and elongation of the lifetime of the projector may be achieved.

In the configuration in the known art, for example, improvement of the cooling efficiency for the optical element by enhancing the pumping performance of the liquid pumping unit and increasing the flow rate of the circulating cooling liquid is conceivable. However, according to at least one previously described embodiment, since the improvement of the cooling efficiency for the optical element is achieved using the thermoelectric conversion element, it is not necessary to enhance the pumping performance of the liquid pumping unit, so that the flexibility of selection of the liquid pumping unit is improved.

In addition, in the configuration in the known art, lowering of the temperature of the cooling liquid by upsizing the radiator to enhance the heat-radiating efficiency is conceivable. However, according to at least one previously described embodiment, since the temperature of the cooling liquid is effectively lowered using the thermoelectric conversion element as described above, it is not necessary to upsize the radiator and, in addition, the same advantages may be enjoyed even when the radiator is omitted, so that downsizing of the projector may be achieved.

The liquid-cooling device may further include a heat-receiving jacket disposed in the flow channel and include a plurality of fine flow channels which allow flow of the cooling liquid therein. The thermoelectric conversion element may be connected to the heat receiving jacket so as to be capable of transferring heat via the heat-absorbing surface.

According to this embodiment, the thermoelectric conversion element may be connected to the heat-receiving jacket of a so-called micro channel including the plurality of fine flow channels in the interior thereof and having a large surface area which comes into contact with the cooling liquid so as to be capable of transferring heat via the heat-absorbing surface. As such, heat of the cooling liquid may be effectively absorbed from the heat-absorbing surface of the thermoelectric conversion element via the heat-receiving jacket, and hence the temperature of the cooling liquid may be effectively lowered.

The thermoelectric conversion element may be connected to the liquid pumping unit so as to be capable of transferring heat via the heat-absorbing surface.

Since the heat-absorbing surface of the thermoelectric conversion element is heat-transferably connected to the liquid pumping unit, the cooling liquid after having been absorbed heat by the heat-absorbing surface of the thermoelectric conversion element via the liquid pumping unit is stirred in the interior of the liquid pumping unit. As such, it is possible to reduce the temperature of the cooling liquid in the liquid pumping unit uniformly and hence a uniform temperature of the circulating cooling liquid may be achieved.

The optical element may include a red light modulator, a green light modulator, and a blue light modulator which modulate a red light, a green light, and a blue light, respectively, according to image data. The optical element holding member may include a red light modulator holding member, a green light modulator holding member, and a blue light modulator holding member corresponding to the red light modulator, the green light modulator, and the blue light modulator. The liquid circulation members connect the red light modulator holding member, the green light modulator holding member, and the blue light modulator holding member in series in the flow channel.

When the respective light modulator holding members are connecting by the liquid circulation members, the order of connection of the respective light modulator holding members may be any order.

The respective light modulator holding members are connected in series in the flow channel of the cooling liquid by the liquid circulation members.

As such, it is not necessary, for example, to employ the structure in which the incoming side or the outgoing side of the cooling liquid of the liquid circulation members is bifurcated according to the respective light modulator holding members in comparison with the configuration in which the light modulator holding members are connected in parallel by the liquid circulation members, so that the structure of the liquid circulation members may be simplified, and thus the liquid-cooling device may be simplified.

When connecting the respective light modulator holding members in series, by disposing the light modulator holding member for holding the light modulator which is subjected to a larger temperature rise than other light modulators on the upstream side of the flow channel, and disposing the light modulator holding member for holding the light modulator which is subjected to a small temperature rise on the downstream side of the flow channel, the light modulators are cooled from the light modulator which is subjected to a larger temperature rise in sequence. As such, the respective light modulators may be efficiently cooled while simplifying the liquid-cooling device.

An air-cooling device having a cooling fan for delivering cooling air to the optical element may be provided.

As such, the optical elements may be further cooled by using the air-cooling device in addition to the cooling structure using the liquid-cooling device and the thermoelectric conversion element.

BRIEF DESCRIPTION OF THE DRAWINGS

Non-limiting and non-exhaustive embodiments of the present disclosure will be described with reference to the accompanying drawings, wherein like reference numbers reference like or similar elements.

DESCRIPTION OF EMBODIMENTS

Figure 1:
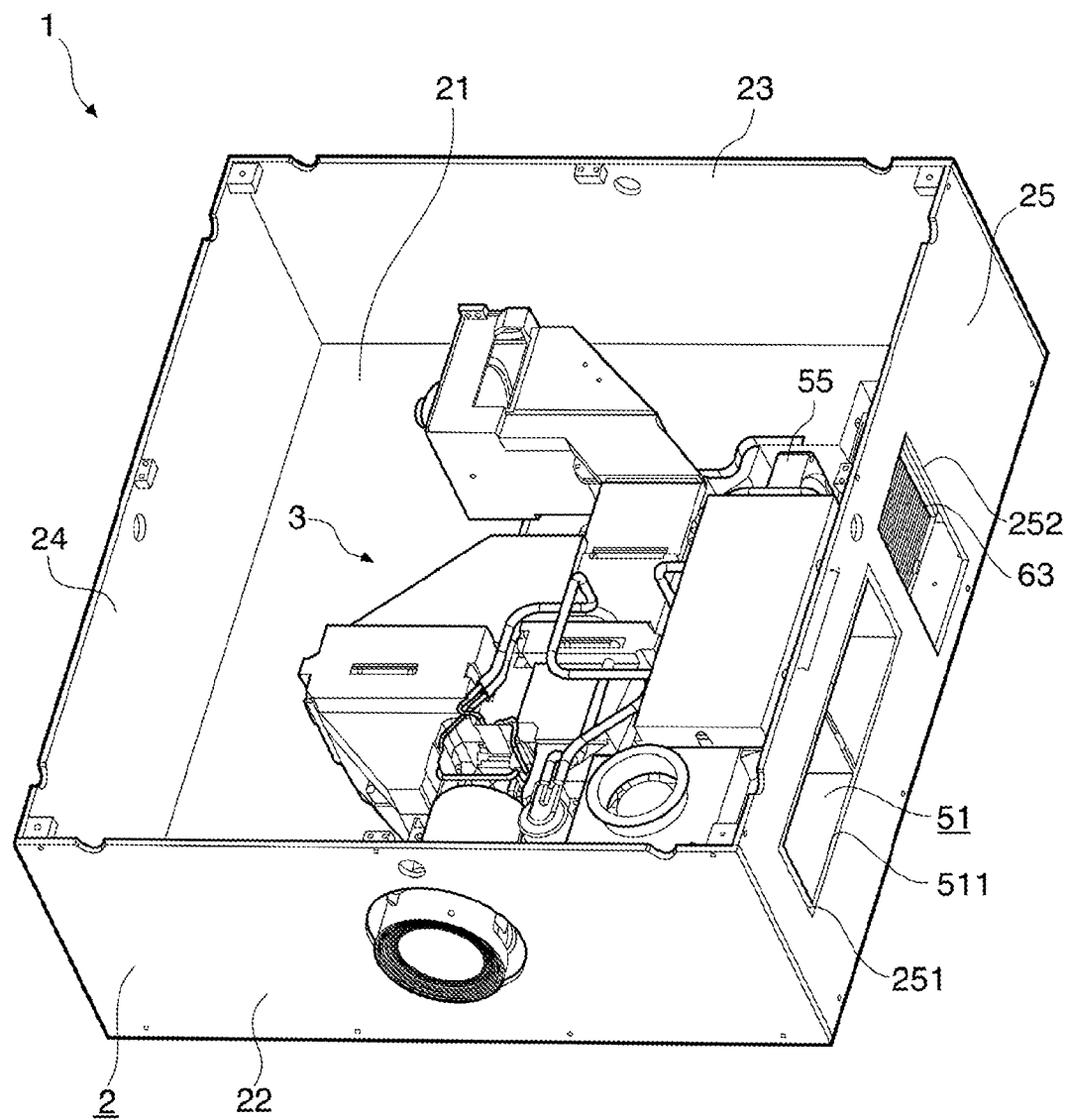
FIG. 1 is a perspective view of the internal structure of a projector according to a first embodiment.

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

Referring now to the drawings, a first embodiment of the disclosure will be described.

Rough Configuration of Projector

FIG. 1 is a perspective view of the internal structure of a projector 1 according to a first embodiment. Specifically, FIG. 1 is a perspective view of the projector 1 when viewed obliquely from the upper front thereof.

The expressions "upper", "lower, "left", and "right" correspond to the upper, lower, left, and right on the basis of the view of FIG. 1. Also, the expressions "front surface" and "back surface" also correspond to the front surface and the back surface on the basis of the view of FIG. 1. The projector 1 modulates a luminous flux emitted from a light source according to image data and forms an image light, and projects the formed image light onto a screen (not shown) in an enlarged scale. The projector 1 includes an outer casing 2 which constitutes an outer shell, and an apparatus body 3 disposed in the interior of the outer casing 2 as shown in FIG. 1.

The outer casing 2 includes a top portion (not shown in FIG. 1), a bottom surface portion 21, a front surface portion 22, a back surface portion 23, a left surface portion 24, and a right surface portion 25 as shown in FIG. 1, and has a rectangular prism shape.

The outer casing 2 is formed with an air-inlet port 251 having a rectangular shape in plan view on the front surface side of the right surface portion 25. Formed on the back surface side of the air-inlet port 251 is an air-exhaust port 252 having a rectangular shape in plan view.

Figure 2:
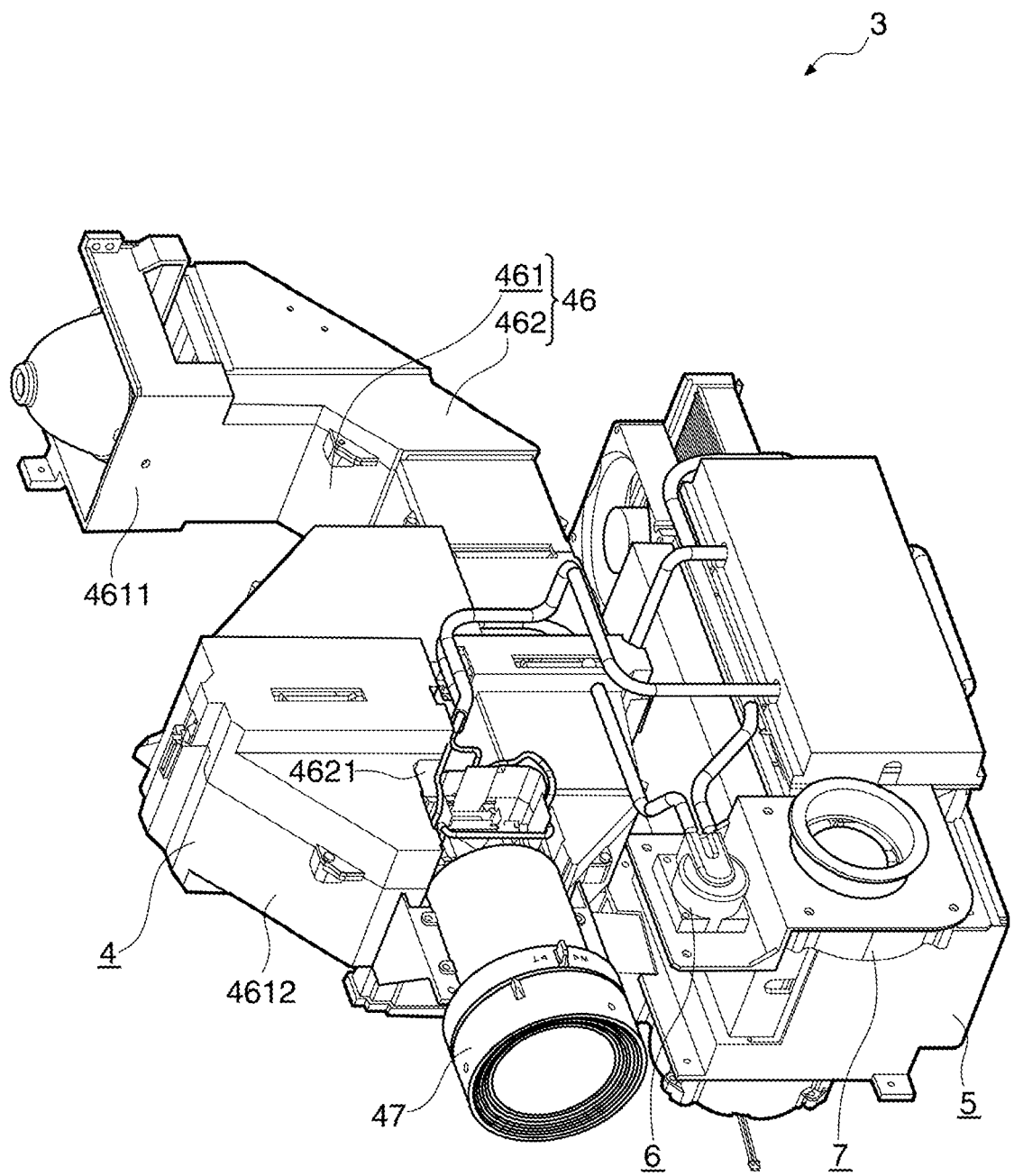
FIG. 2 illustrates an apparatus body according to the first embodiment.
Figure 3:
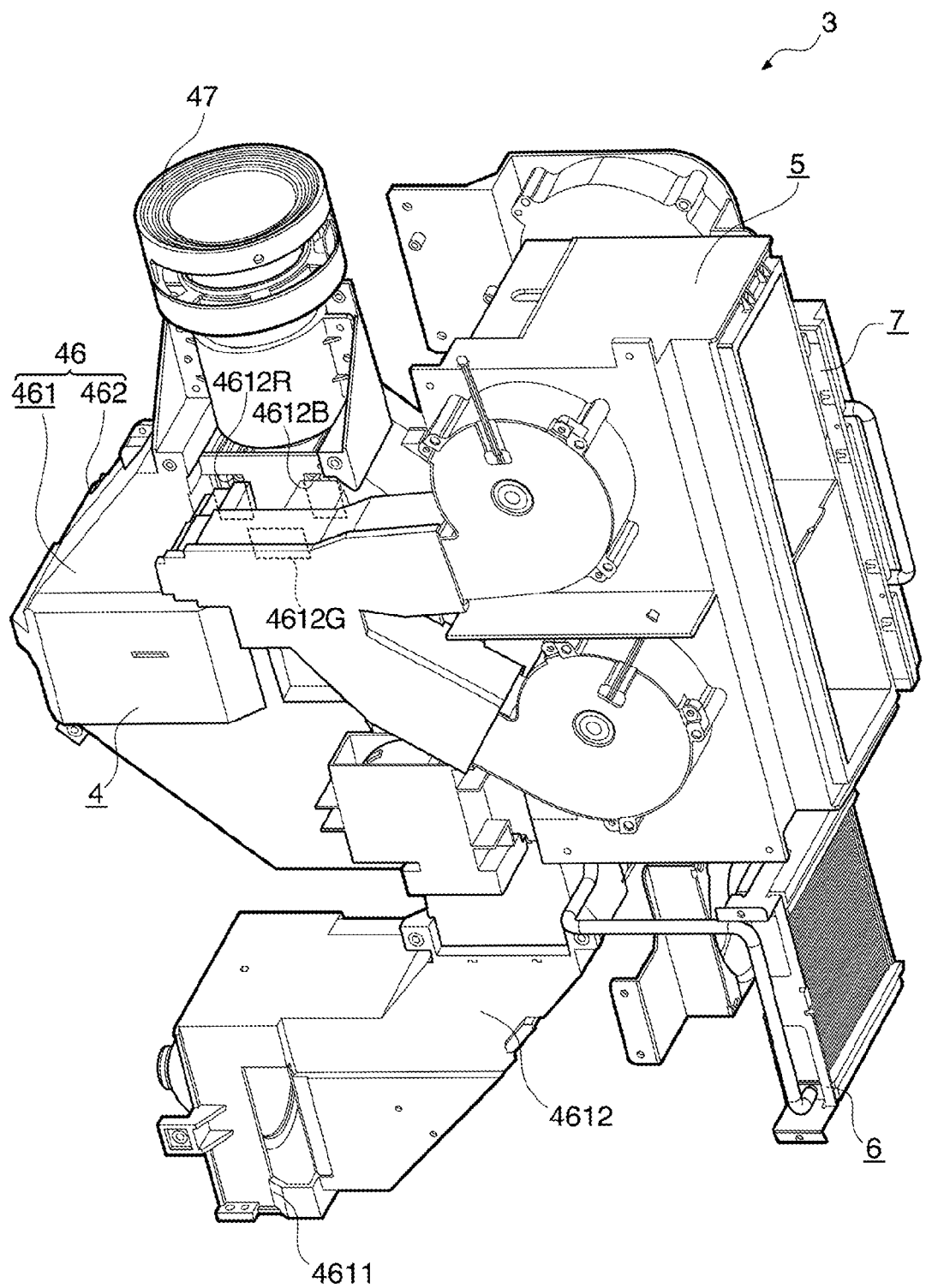
FIG. 3 illustrates the apparatus body according to the first embodiment.

FIG. 2 and FIG. 3 are drawings showing the apparatus body 3. Specifically, FIG. 2 is a perspective view of the apparatus body 3 when viewed obliquely from the upper front thereof. FIG. 3 is a perspective view of the apparatus body 3 when viewed obliquely from the lower front thereof.

The apparatus body 3 includes an optical unit 4, an air-cooling device 5, a liquid-cooling device 6, and a thermoelectric conversion unit 7 as shown in FIG. 2 or FIG. 3.

Although it is not shown in the drawing in detail, a power source unit that supplies power to the respective components of the projector 1, and a control device that controls operating conditions of the respective components of the projector 1 are arranged in a space other than the respective members 4 to 7 in the outer casing 2.

Configuration of Optical Unit

Figure 4:
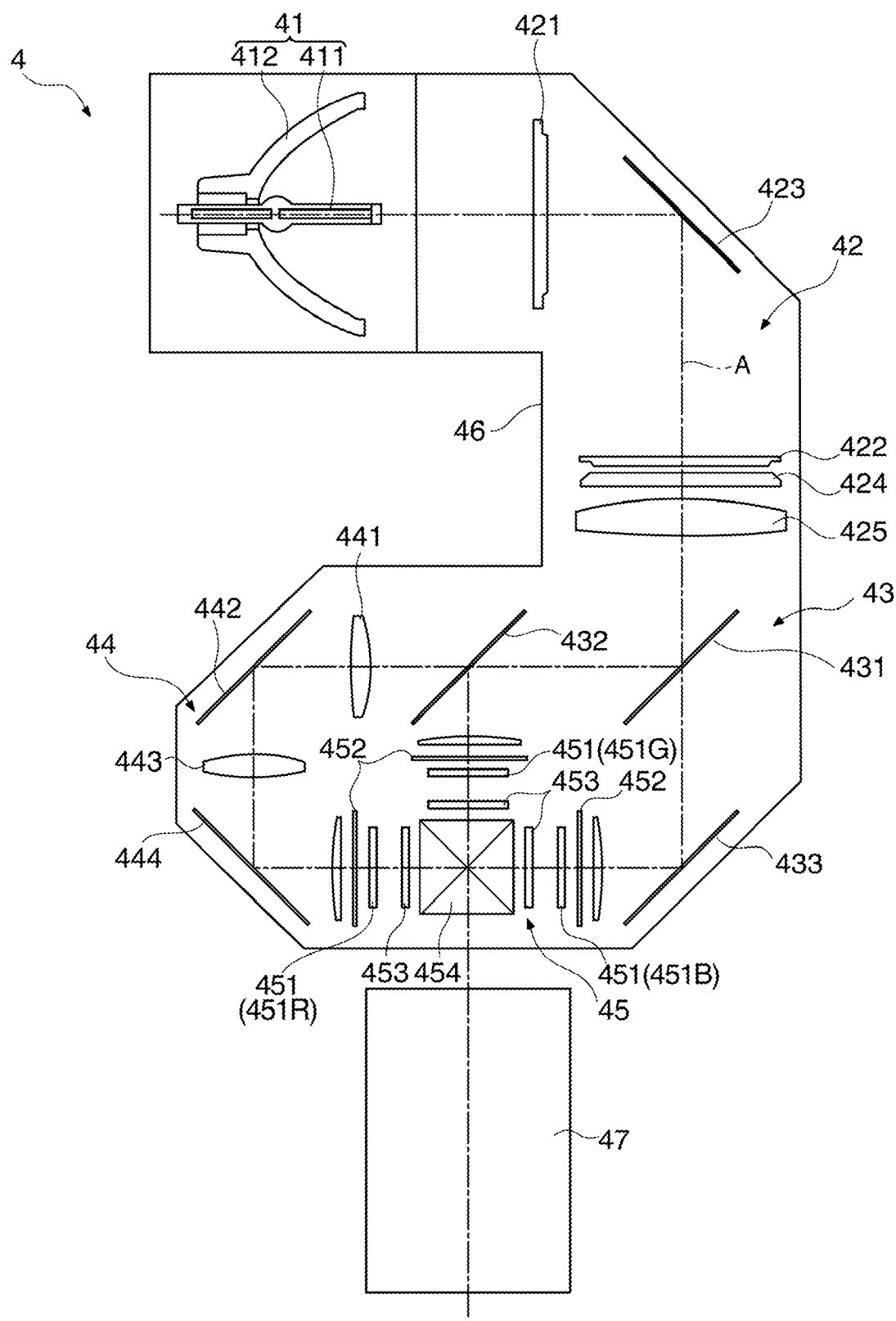
FIG. 4 is a plan view schematically illustrating an optical system of an optical unit according to the first embodiment.

FIG. 4 is a plan view schematically showing an optical system of the optical unit 4.

The optical unit 4 is configured to form the image light according to the image data under the control of the control device, and has a substantially L-shape in plan view extending from the left side to the right side along the back surface of the outer casing 2 and bending toward the front surface side at the distal end portion in the direction of extension.

The optical unit 4 includes a light source 41 having a light source lamp 411 and a reflector 412, an illumination optical device 42 having lens arrays 421 and 422, a reflection mirror 423, polarization conversion element 424, and a superimposing lens 425, a color-separation optical device 43 having dichroic mirrors 431 and 432 and a reflection mirror 433, a relay optical device 44 having an incident-side lens 441, a relay lens 443, and reflection mirrors 442 and 444, an optical device 45 having three liquid crystal panels 451 (including a liquid crystal panel 451R on the red light side as a red light modulator, a liquid crystal panel 451G on the green light side as a green light modulator, and a liquid crystal panel 451B on the blue light side as a blue light modulator) as light modulators (optical elements), three incident-side deflection plates 452, three outgoing-side deflection plates 453, and a cross-dichroic prism 454 as a color combining optical device, an optical component casing 46, and a projection lens 47 as the projection optical device as shown in FIG. 4.

In this configuration, in the optical unit 4, a luminous flux emitted from the light source 41 and passed through the illumination optical device 42 is separated into three color lights of R, G, and B by the color-separation optical device 43. The separated color lights are modulated respectively according to the image data by the respective liquid crystal panels 451, and the image lights of the respective color lights are formed. The image lights of the respective color lights are combined by the cross-dichroic prism 454, and are projected onto the screen (not shown) by the projection lens 47 in an enlarged scale.

Since the respective optical components 41 to 45, and 47 are used as optical systems of projectors of various general types, detailed description will be omitted, and the configuration of the optical component casing 46 will be described below.

The optical component casing 46 is substantially L-shaped in plan view as shown in FIG. 2 or FIG. 3. A predetermined illumination optical axis A (FIG. 4) is set in the interior thereof, and the above-described respective optical components 41 to 45 are arranged at predetermined positions with respect to the illumination optical axis A. The optical component casing 46 includes a component storing member 461 and a lid-shaped member 462.

The component storing member 461 includes an optical device storage 4611 and a component storage body 4612.

The optical device storage 4611 is positioned on one side of the optical component casing 46 in the L-shape, and is formed into a container shape having an opening on the left side. Then, the light source 41 is stored in the optical device storage 4611 via the opening.

The component storage body 4612 is formed into a container shape having an opening (not shown) on the upper side thereof. The respective optical components 42 to 44 are stored in the component storage body 4612 via the opening in sequence from one end side connected to the optical device storage 4611, and the optical device 45 is stored on the other end side, which is the opposite side from the one end side. The projection lens 47 is attached to the component storage body 4612 on the side surface opposing to the optical device 45.

In the component storage body 4612, openings 4612R, 4612G, and 4612B (FIG. 3) are formed on the lower end surface thereof at positions corresponding to the positions of arrangement of the respective liquid crystal panels 451R, 451G, and 451B, which constitute the optical device 45.

The lid-shaped member 462 is a member to close the opening on the upper side of the component storage body 4612, and has substantially the same shape in plan view as the shape of the component storage body 4612 in plan view.

The lid-shaped member 462 is formed with a U-shaped notch 4621 (FIG. 2) so as to surround the optical device 45 two-dimensionally corresponding to the position of arrangement of the optical device 45.

Configuration of Air-Cooling Device

Figure 5:
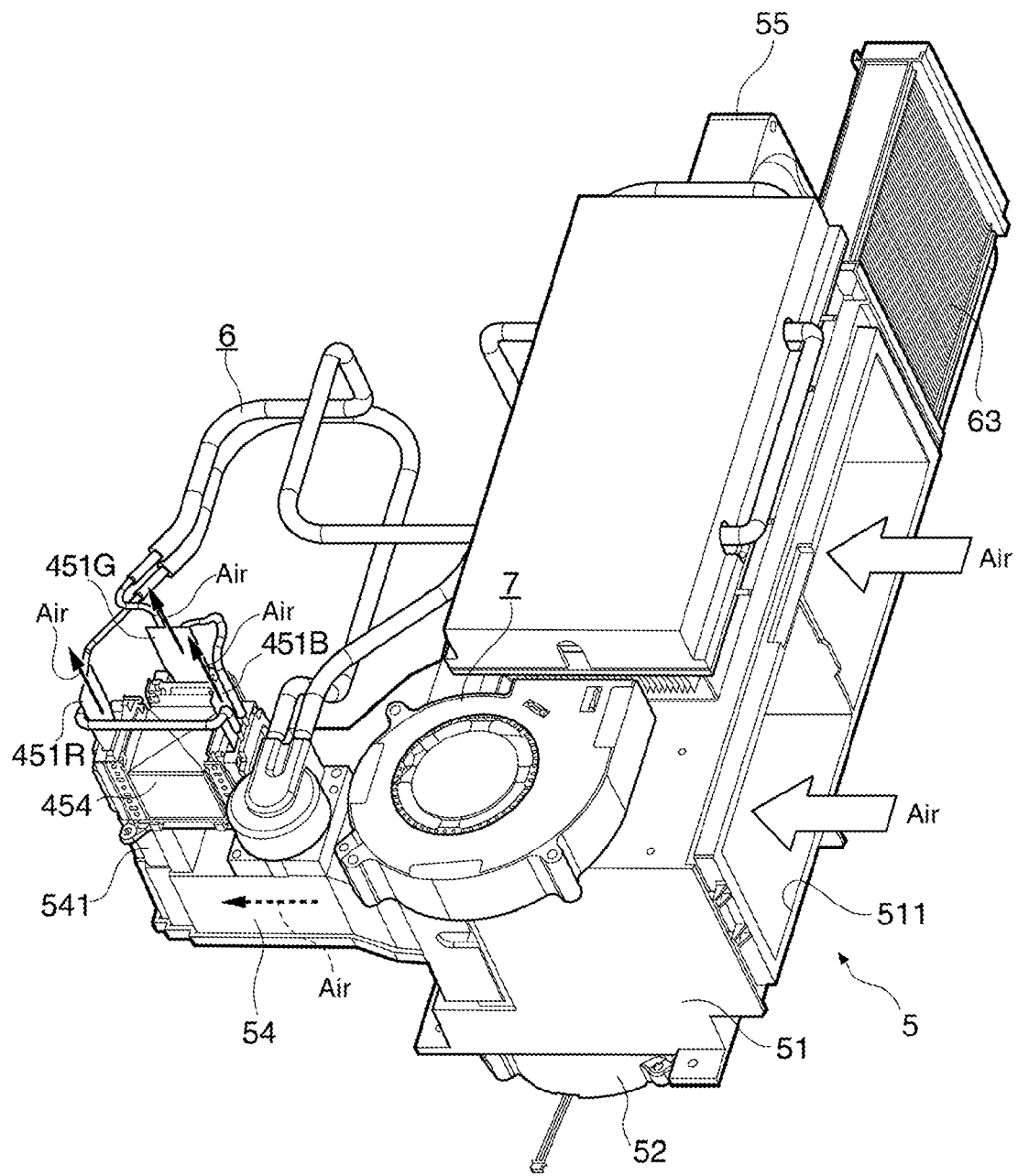
FIG. 5 illustrates the configuration of an air-cooling device according to the first embodiment.
Figure 6:
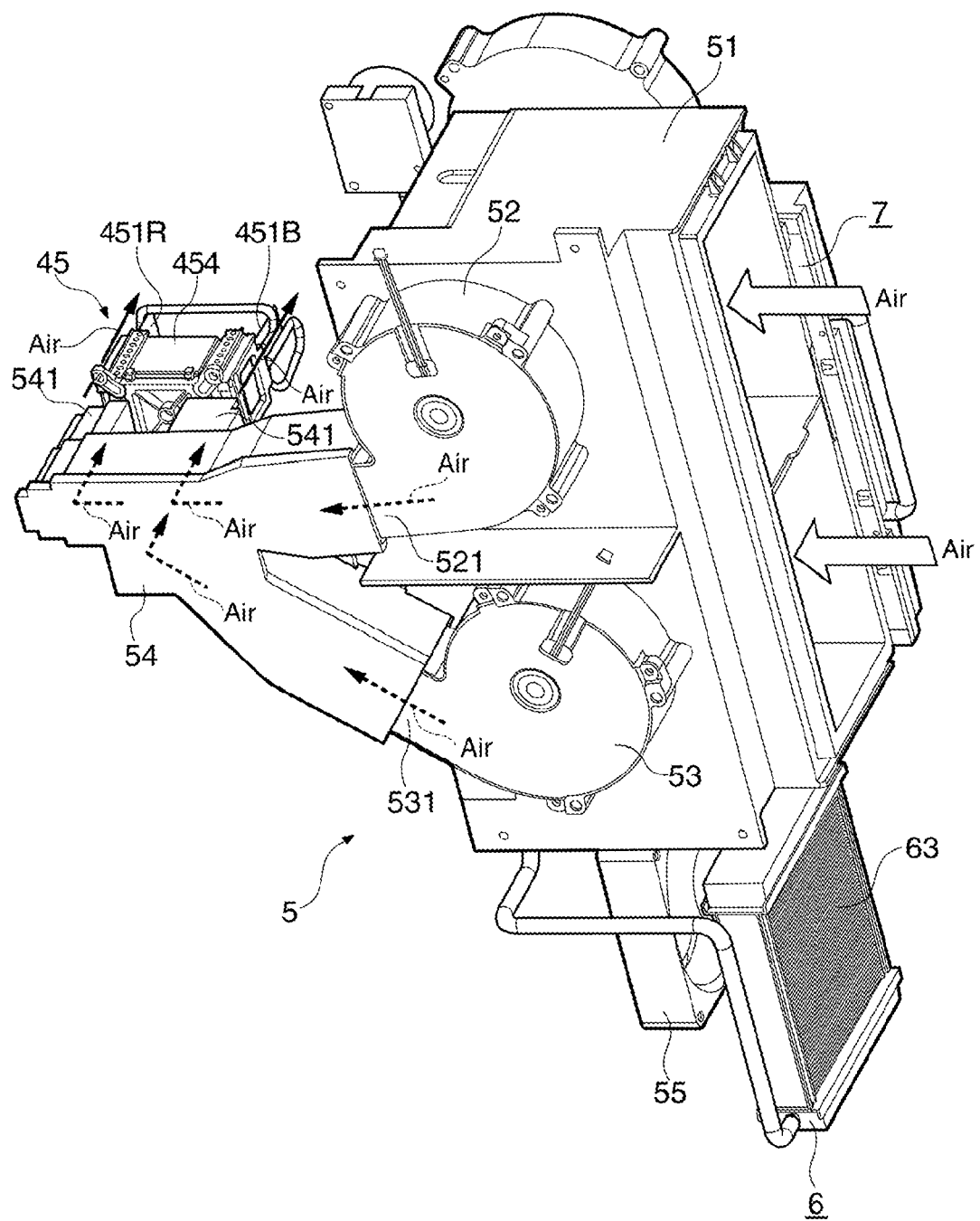
FIG. 6 illustrates the configuration of the air-cooling device according to the first embodiment.

FIG. 5 and FIG. 6 are drawings for explaining the configuration of the air-cooling devices. Specifically, FIG. 5 is a perspective view of the air-cooling device 5, the liquid-cooling device 6, and the thermoelectric conversion unit 7 viewed obliquely from the upper front thereof. FIG. 6 is a perspective view of the air-cooling device 5, the liquid-cooling device 6, and the thermoelectric conversion unit 7 viewed obliquely from the lower front thereof.

The air-cooling device 5 sends air to a radiator 63, described later, which constitutes the optical device 45 and the liquid-cooling device 6, and forcedly cools the optical device 45 and the radiator 63. As shown in FIG. 5 or FIG. 6, the air-cooling device 5 includes an air-inlet duct 51, a pair of sirocco fans 52 and 53 (FIG. 6) as cooling fans, a fan duct 54, and an axial fan 55.

The air-inlet duct 51 is formed into a rectangular prism shape having an opening 511 on the right surface, and is disposed in such a manner that the opening 511 is connected to the air-inlet port 251 in the interior of the outer casing 2 (FIG. 1). Although it is not shown in the drawing in detail, a pair of openings for allowing inside air to flow out to the outside are formed on the lower end surface of the air-inlet duct 51 respectively on the front surface side and the back surface side thereof. Then, the air-inlet duct 51 allows air introduced from outside the outer casing 2 via the air-inlet port 251 into the outer casing 2 to flow into the interior thereof via an opening 511, and to flow out from the lower side via the pair of openings formed on the lower end surface.

The pair of sirocco fans 52 and 53 are attached to the lower end surface of the air-inlet duct 51 in a state in which respective discharge ports 521 and 531 (FIG. 6) face leftward and respective inlet ports (not shown) face upward. In this state, the respective inlet ports (not shown) of the pair of sirocco fans 52 and 53 are connected to the pair of openings formed on the lower end surface of the air-inlet duct 51, respectively. The pair of sirocco fans 52 and 53 intake the air outside the outer casing 2 via the air-inlet port 251 and the air-inlet duct 51, and discharge the same to the left side from the respective discharge ports 521 and 531.

The fan duct 54 is bifurcated from the lower side of the position where the optical device 45 is disposed toward the discharge ports 521 and 531, and the distal ends thereof are connected to the discharge ports 521 and 531 respectively.

Formed on the upper end surface of the fan duct 54 are three outflowing portions 541 projecting upward corresponding to the three openings 4612R, 4612G, and 4612B of the optical component casing 46 for allowing the inside air to flow out.

The fan duct 54 flows out the air discharged from the pair of sirocco fans 52 and 53 upward from the lower side via the respective outflowing portions 541. The air passed through the fan duct 54 is introduced into the interior of the optical component casing 46 via the three openings 4612R, 4612G, and 4612B of the optical component casing 46, flows upward from below between the members 451 to 453 on the side of the respective color lights in the optical device 45, thereby cooling the respective members 451 to 453. The air after having cooled the respective members 451 to 453 is discharged to the outside of the optical component casing 46 via the notch 4621 of the lid-shaped member 462.

The axial fan 55 is arranged so as to oppose to the air-exhaust port 252 with the intermediary of the radiator 63, and discharges taken air toward the radiator 63, thereby cooling the radiator 63. The air passed through the radiator 63 is discharged to the outside of the outer casing 2 from the air-exhaust port 252.

Configuration of Liquid-Cooling Device

Figure 7:
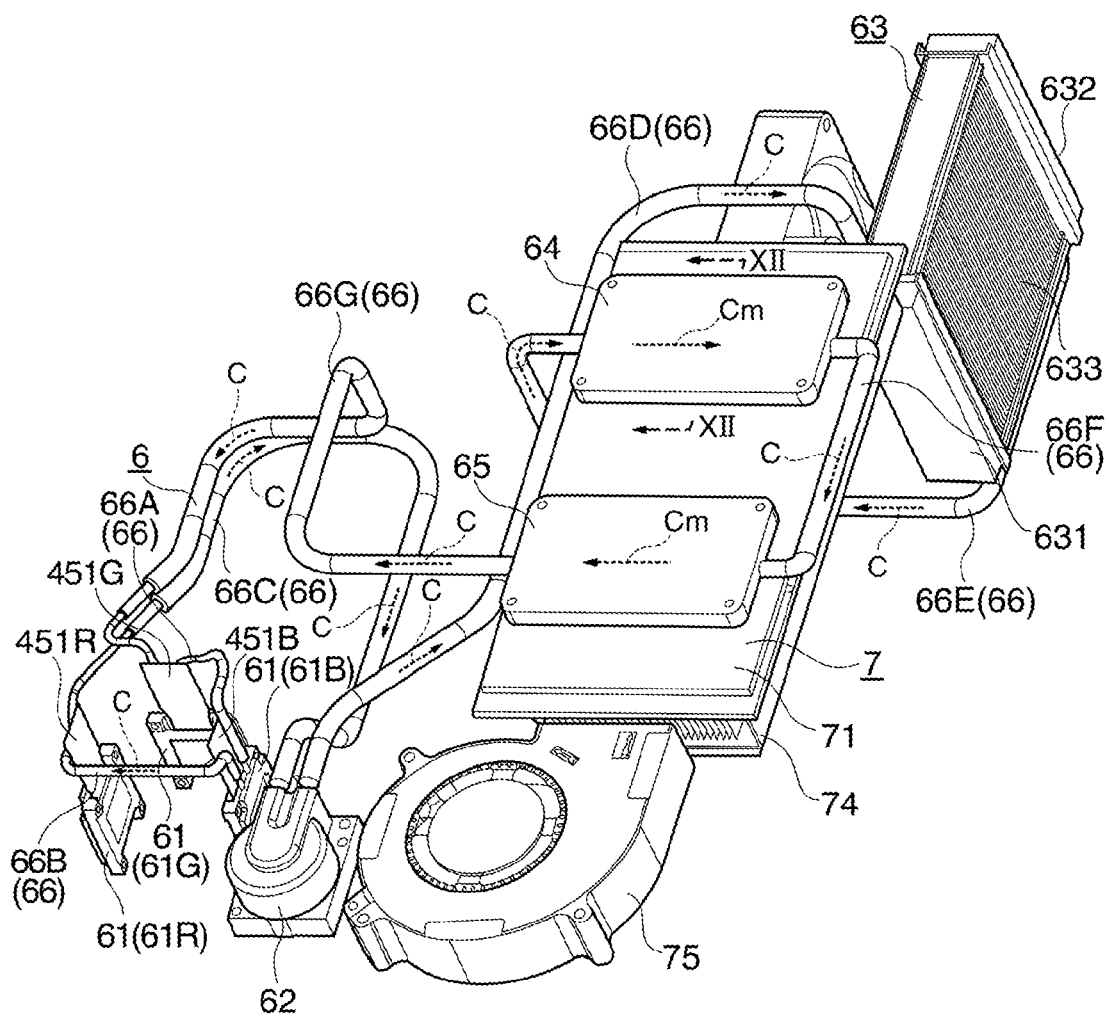
FIG. 7 illustrates the configurations of a liquid-cooling device and a thermoelectric conversion unit according to the first embodiment.
Figure 8:
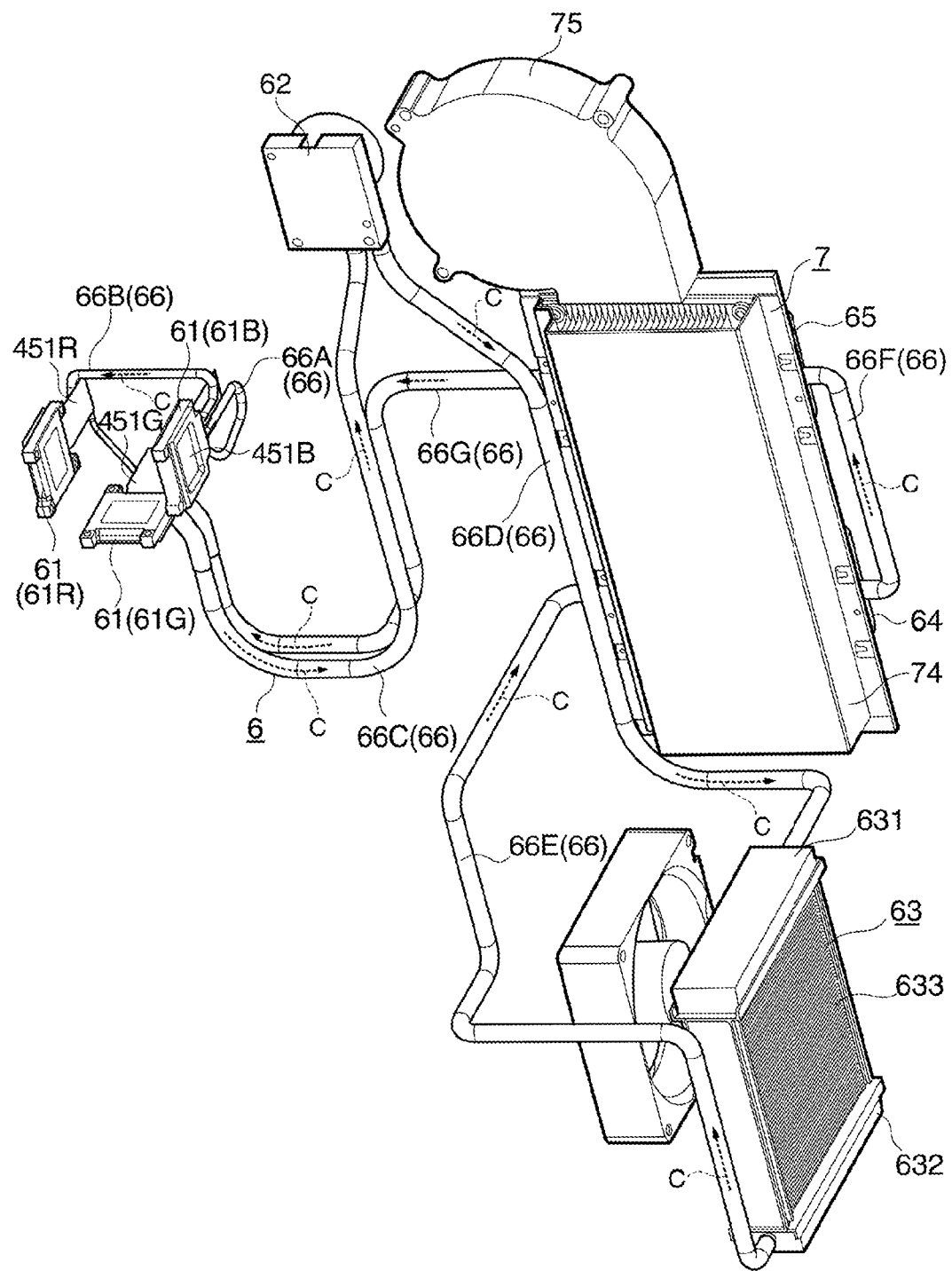
FIG. 8 illustrates the configurations of the liquid-cooling device and the thermoelectric conversion unit according to the first embodiment.

FIG. 7 and FIG. 8 are drawings for explaining the configurations of the liquid-cooling device 6 and the thermoelectric conversion unit 7. Specifically, FIG. 7 is a perspective view of the liquid-cooling device 6 and the thermoelectric conversion unit 7 when viewed obliquely from the upper front thereof. FIG. 8 is a perspective view of the liquid-cooling device 6 and the thermoelectric conversion unit 7 when viewed obliquely from the lower front thereof.

The liquid-cooling device 6 causes cooling liquid such as water or ethylene glycol to circulate along an annular flow channel and cools the liquid crystal panels 451 as the optical element with the cooling liquid. The liquid-cooling device 6 includes three optical element holding members 61, a liquid pumping unit 62, the radiator 63, a first heat-receiving jacket 64 and a second heat-receiving jacket 65, and a plurality of liquid circulation members 66 as shown in FIG. 7 or FIG. 8.

The plurality of liquid circulation members 66 are formed of tubular members which allow the cooling liquid to flow therein, and connect the respective members 61 to 65 to form the annular flow channel.

The connecting structure of the respective members 61 to 65 with the liquid circulation members 66 will be described later.

Configuration of Optical Element Holding Members

Figure 9:
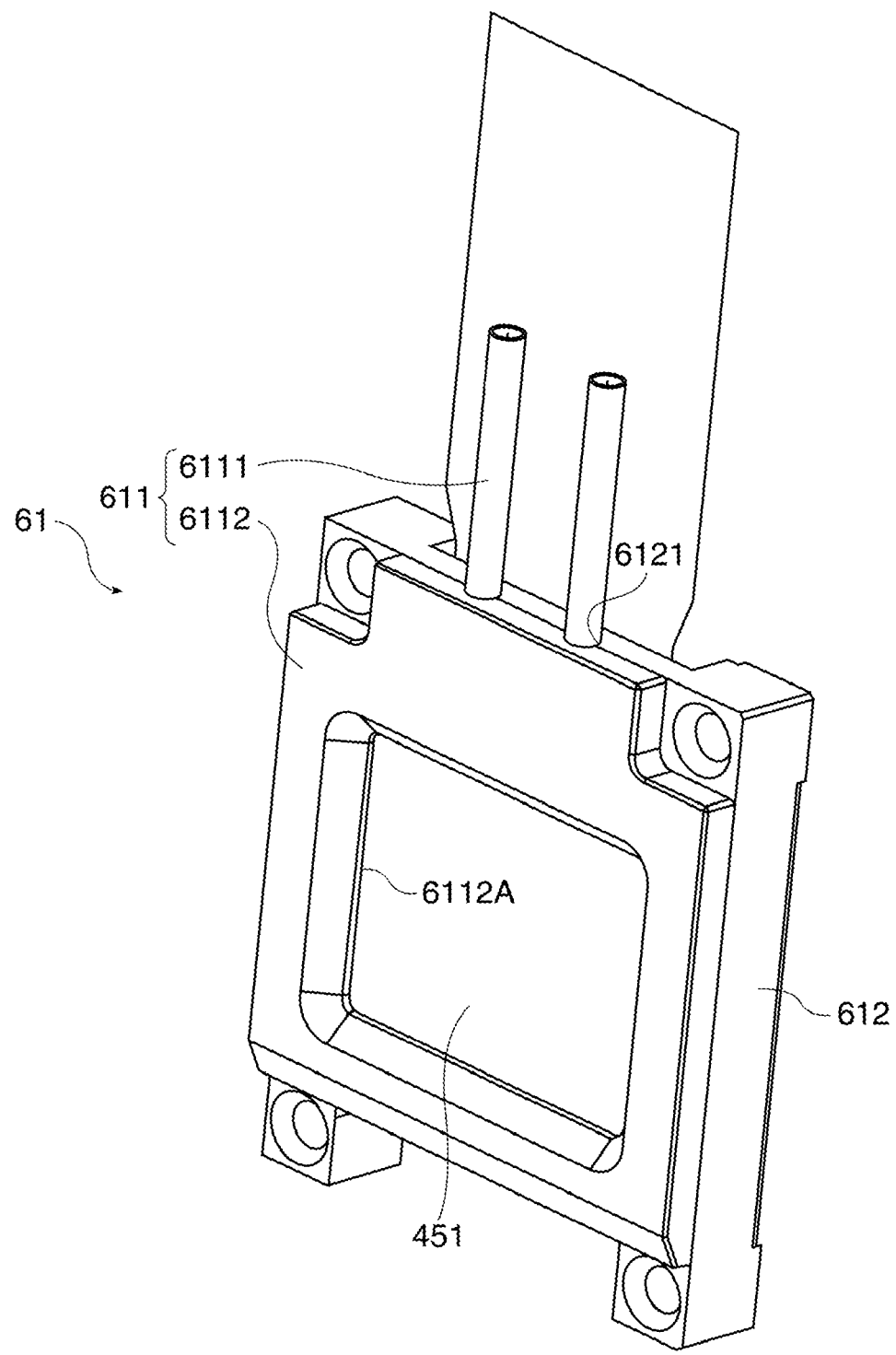
FIG. 9 illustrates the structure of an optical element holding member according to the first embodiment.
Figure 10:
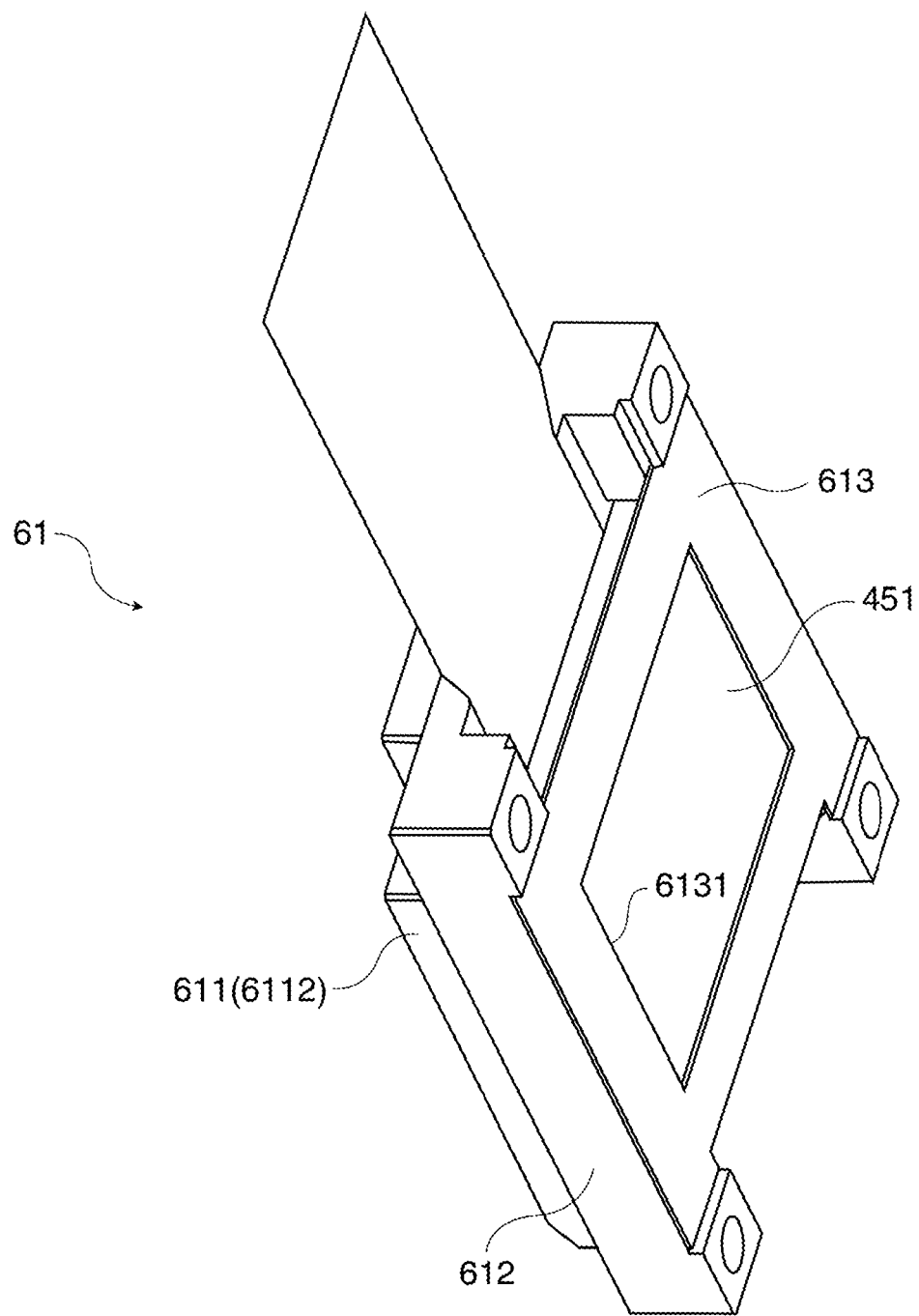
FIG. 10 illustrates the structure of an optical element holding member according to the first embodiment.

FIG. 9 and FIG. 10 are drawing showing the structure of the optical element holding members 61. Specifically, FIG. 9 is a perspective view of the optical element holding member 61 when viewed from the side where the luminous flux enters. FIG. 10 is a perspective view of the optical element holding member 61 when viewed from the side where the luminous flux goes out.

The three optical element holding members 61 hold the three liquid crystal panels 451, and include the cooling liquid flowing in and out therein, thereby cooling the three liquid crystal panels 451 with the cooling liquid. The optical element holding members 61 all have the same configuration, and hence only one of the optical element holding members 61 will be described below. The optical element holding member 61 includes a liquid flowing unit 611, an optical element supporting frame 612, and a frame member 613 (FIG. 10) as shown in FIG. 9 or FIG. 10.

Figure 11:
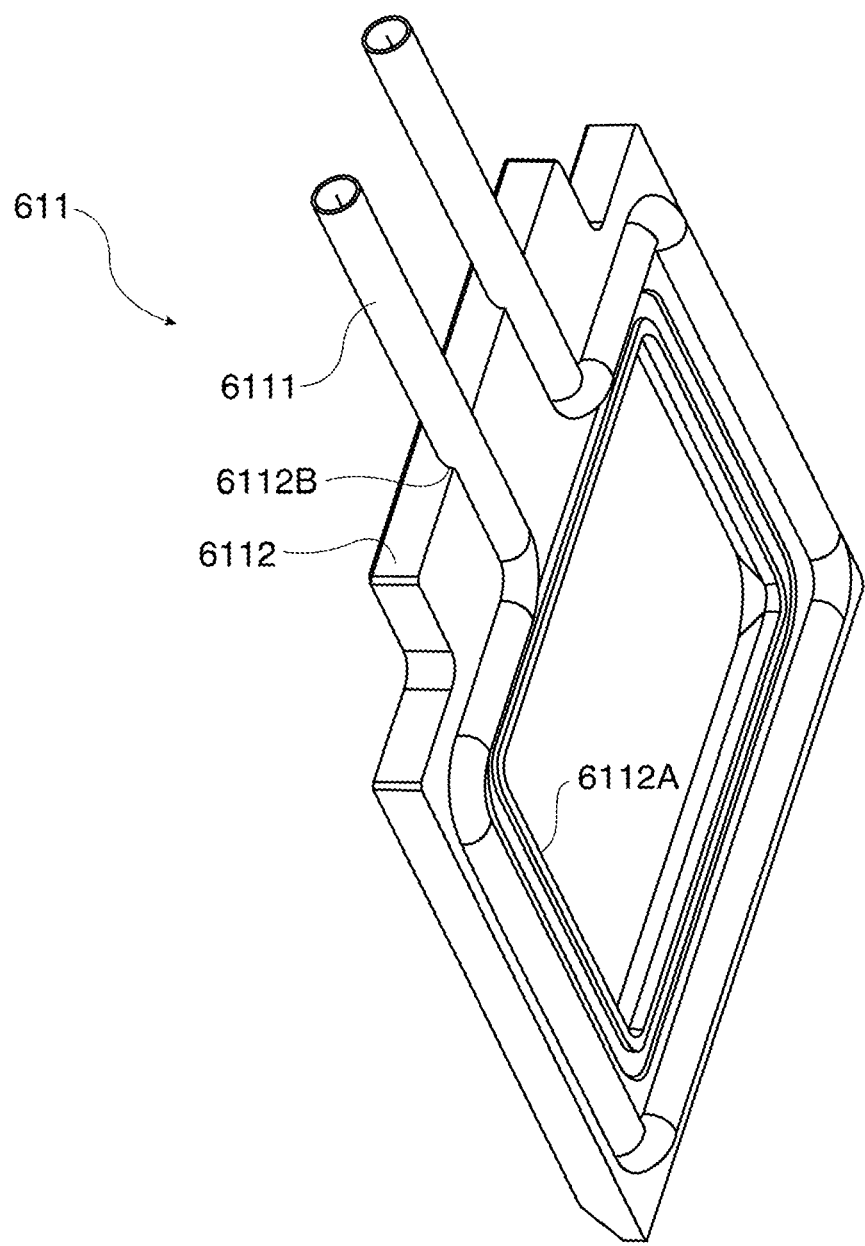
FIG. 11 illustrates the structure of a liquid flowing unit according to the first embodiment.

FIG. 11 is a drawing showing the structure of the liquid flowing unit 611. Specifically, FIG. 11 is a perspective view of the liquid flowing unit 611 when viewed from the side where the luminous flux goes out.

The liquid flowing unit 611 is positioned on the side of the optical element holding member 61 where the luminous flux enters, and causes the cooling liquid to flow in the interior thereof. The liquid flowing unit 611 includes a liquid flowing tube 6111 and a mounting member 6112 as shown in FIG. 11.

The liquid flowing tube 6111 is formed into a rectangular frame shape which surrounds an image forming area (light-transmitting area) of the liquid crystal panel 451 in plan view, and the respective ends which allow the cooling liquid to flow in and out are formed so as to extend in parallel to each other on the upper side.

The mounting member 6112 is formed of a plate member having a rectangular shape in plan view, which has a rectangular-shaped opening 6112A according to the image forming area of the liquid crystal panel 451.

The mounting member 6112 is formed with a recess 6112B corresponding to the shape of the liquid flowing tube 6111 on the end surface on the side where the luminous flux goes out. The liquid flowing tube 6111 is fitted into the recess 6112B, and is heat-transferably connected to the mounting member 6112.

Although it is not shown in the drawing in detail, the optical element supporting frame 612 includes a rectangular-shaped opening according to the image forming area of the liquid crystal panel 451, and supports the liquid crystal panel 451 on the side where the luminous flux goes out.

The optical element supporting frame 612 is formed with a recess 6121 (FIG. 9) corresponding to the shape of the liquid flowing tube 6111 on the end surface on the side where the luminous flux enters. Then, the liquid flowing tube 6111 is fitted to the recess 6121 in a state in which the mounting member 6112 is heat-transferably connected to the end surface of the optical element supporting frame 612 on the side where the luminous flux enters, and is heat-transferably connected to the optical element supporting frame 612.

Although it is not shown in the drawing in detail, the optical element supporting frame 612 is formed with a recess corresponding to the outer shape (shouldered shape) of the liquid crystal panel 451 for storing and holding the liquid crystal panel 451 along the peripheral edge of the opening on the side where the luminous flux goes out, and is heat-transferably connected to the liquid crystal panel 451 in the recess.

The frame member 613 is a bendable sheet-like member and has a rectangular-shaped opening 6131 (FIG. 10) corresponding to the image forming area of the liquid crystal panel 451. Then, the frame member 613 is attached so as to straddle the optical element supporting frame 612 and the liquid crystal panel 451 as shown in FIG. 10. The surfaces of the optical element supporting frame 612 and the liquid crystal panel 451 on the side where the luminous flux enters are heat-transferably connected, while the surfaces of the optical element supporting frame 612 and the liquid crystal panel 451 on the side where the luminous flux goes out are also heat-transferably connected via the frame member 613.

The frame member 613 may simply be formed of heat-conductive material and be a foldable sheet-like member and, for example, a metallic member or a graphite sheet may be employed.

Configuration of Liquid Pumping Unit

The liquid pumping unit 62 is a pump for sucking and pumping the cooling liquid, and circulates the cooling liquid along the annular flow channel.

The liquid pumping unit 62 has a configuration in which an impeller is arranged, for example, in a hollow member, and sucks and pumps the cooling liquid by rotation of the impeller.

The configuration of the liquid pumping unit 62 is not limited to the configuration of a continuously delivering type having the impeller as described above, and other configurations such as an intermittently delivering type using a diaphragm may also be employed.

Configuration of Radiator

The radiator 63 is disposed so as to oppose to the air-exhaust port 252 in the interior of the outer casing 2 (FIG. 1) and radiates heat of the cooling liquid circulating along the annular flow channel. As shown in FIG. 7 or FIG. 8, the radiator 63 includes a pair of liquid accumulating portions 631 and 632 and a radiator body 633.

The pair of liquid accumulating portions 631 and 632 are each formed of a substantially rectangular prism-shaped hollow member.

The radiator body 633 is interposed between the pair of liquid accumulating portions 631 and 632. Although it is not shown in the drawing in detail, the radiator body 633 has a structure in which the liquid accumulating portions 631 and 632 are communicated with each other with a plurality of flow channels which allow the cooling liquid to flow therein, so that air is able to flow between the flow channels.

In other words, when the cooling liquid flows in the plurality of flow channels in the radiator body 633, heat of the cooling liquid is transferred to the radiator body 633. Air discharged from the axial fan 55 flows between the respective flow channels, thereby cooling the radiator body 633.

Configuration of Heat-Receiving Jacket

Figure 12:
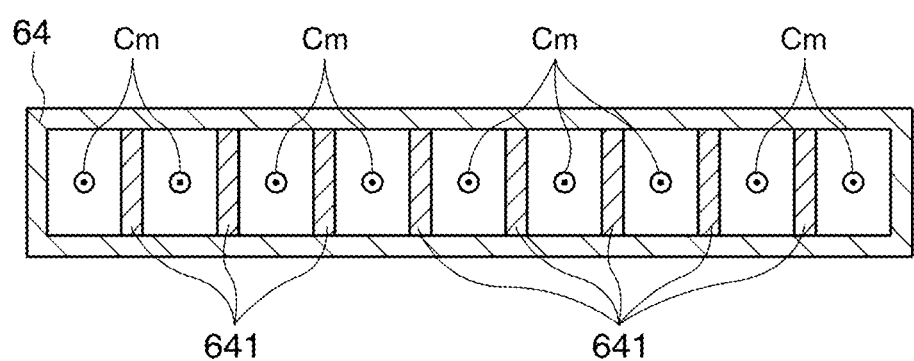
FIG. 12 is a cross-sectional view schematically illustrating the interior structure of a first heat-receiving jacket according to the first embodiment.

FIG. 12 is a cross-sectional view schematically showing the internal structure of the first heat-receiving jacket 64. Specifically, FIG. 12 is a cross-sectional view taken along the line XII-XII in FIG. 7.

Since the heat-receiving jackets 64 and 65 have similar configurations, only the first heat-receiving jacket 64 will be described in the following description.

The first heat-receiving jacket 64 is formed of a substantially rectangular prism-shaped hollow member and receives heat from the cooling liquid flowing in the interior thereof.

As shown in FIG. 12, a plurality of panel members 641 extending along the direction of flow of the cooling liquid are arranged in parallel in the direction orthogonal to the direction of flow of the cooling liquid in the interior of the first heat-receiving jacket 64. Specifically, the panel members 641 have a thickness of about several tens micrometers to several hundreds micrometers and are arranged at a distance of about several tens micrometers to several hundreds micrometers from each other.

In this configuration, a plurality of fine flow channels Cm in which the cooling liquid flows are formed between the panel members 641 in the interior of the first heat-receiving jacket 64. In other words, the first heat-receiving jacket 64 includes a heat exchanger such as a so-called microchannel.

Configuration of Thermoelectric Conversion Unit

Figure 13:
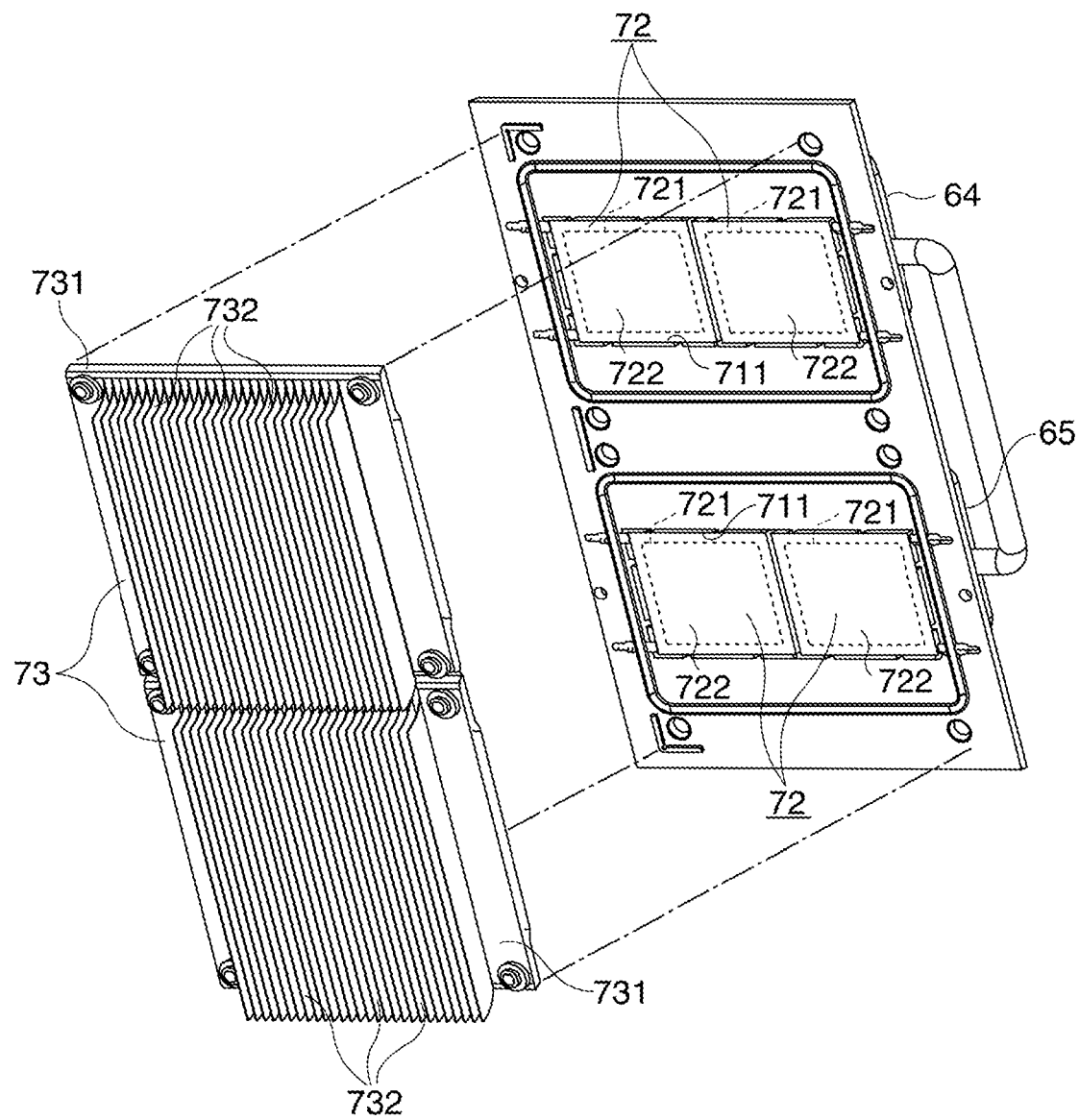
FIG. 13 illustrates the configuration of the thermoelectric conversion unit according to the first embodiment.

FIG. 13 is a drawing for explaining the configuration of the thermoelectric conversion unit 7. Specifically, FIG. 13 is an exploded perspective view in which part of the thermoelectric conversion unit 7 is disassembled and viewed from the lower side.

The thermoelectric conversion unit 7 is disposed on the upper side of the air-inlet duct 51, and absorbs heat from the cooling liquid flowing in the interiors of the heat-receiving jackets 64 and 65. As shown in FIG. 7, FIG. 8, or FIG. 13, the thermoelectric conversion unit 7 includes supporting member 71, four Peltier elements 72 (FIG. 13) as thermoelectric conversion elements, two heat-radiating heat transfer members 73 (FIG. 13), a baffle member 74 (FIG. 7, FIG. 8), and a sirocco fan 75 (FIG. 7, FIG. 8).

The supporting member 71 includes a plate member of a rectangular shape in plan view, and integrates the two heat-receiving jackets 64 and 65, the four Peltier elements 72, the two heat-radiating heat transfer members 73, and the baffle member 74. The supporting member 71 is formed of a material having a low coefficient of thermal conductivity (for example, 0.9 W/(m·K) or lower).

As shown in FIG. 13, the supporting member 71 is formed with openings 711 having a rectangular shape smaller than the planer shapes of the heat-receiving jackets 64 and 65 and allowing the two Peltier elements 72 to fit therein on the front side and the back side.

The heat-receiving jackets 64 and 65 are fixed to the peripheral edge portions of the openings 711 respectively at the upper end surface of the supporting member 71.

Although it is not shown in the drawing in detail, the Peltier elements 72 includes a plurality of joint pairs formed by joining a p-type semiconductor and an n-type semiconductor with metallic strips, and the plurality of joint pairs are electrically connected directly to each other.

When power is supplied to the Peltier elements 72 having such a configuration, as shown in FIG. 13, one end surface of the each Peltier elements 72 (the upper end surface) serves as a heat-absorbing surface 721 which absorbs heat, and the other end surface (the lower end surface) serves as a heat-radiating surface 722 which radiates heat.

Then, the Peltier elements 72 are fitted to the openings 711 of the supporting member 71, and the heat-absorbing surfaces 721 are heat-transferably connected to the lower end surfaces of the heat-receiving jackets 64 and 65.

The two heat-radiating heat transfer members 73 have the similar shapes as shown in FIG. 13, and include, so called heat sinks each having a rectangular panel member 731, and a plurality of fin members 732 projecting from the lower end surface of the panel member 731 and extending in the fore-and-aft direction. Then, the respective heat-radiating heat transfer members 73 are fixed respectively to the peripheral edge portions of the openings 711 at the lower end surface of the supporting member 71. In this state, the heat-radiating heat transfer members 73 are heat-transferably connected respectively to the heat-radiating surfaces 722 of the respective Peltier elements 72.

In other words, in a state in which the heat-receiving jackets 64 and 65, the Peltier elements 72, and the heat-radiating heat transfer members 73 are integrated by the supporting member 71, a heat transfer route from the respective heat-receiving jackets 64 and 65 to the respective Peltier elements 72, and then to the heat-radiating heat transfer members 73 are established.

The baffle member 74 is formed into a substantially U-shape in cross section extending in the fore-and-aft direction, and is fixed to the lower end surface of the supporting member 71 in such a manner that the respective heat-radiating heat transfer members 73 are positioned inside the U-shape. In other words, the baffle member 74 defines a cylindrical space for allowing the air to flow in the fore-and-aft direction between itself and the supporting member 71.

The sirocco fan 75 is disposed on the front surface side of the baffle member 74, and discharges sucked air toward the cylindrical space defined by the supporting member 71 and the baffle member 74.

Connecting Structure with Liquid Circulation Member

Figure 14:
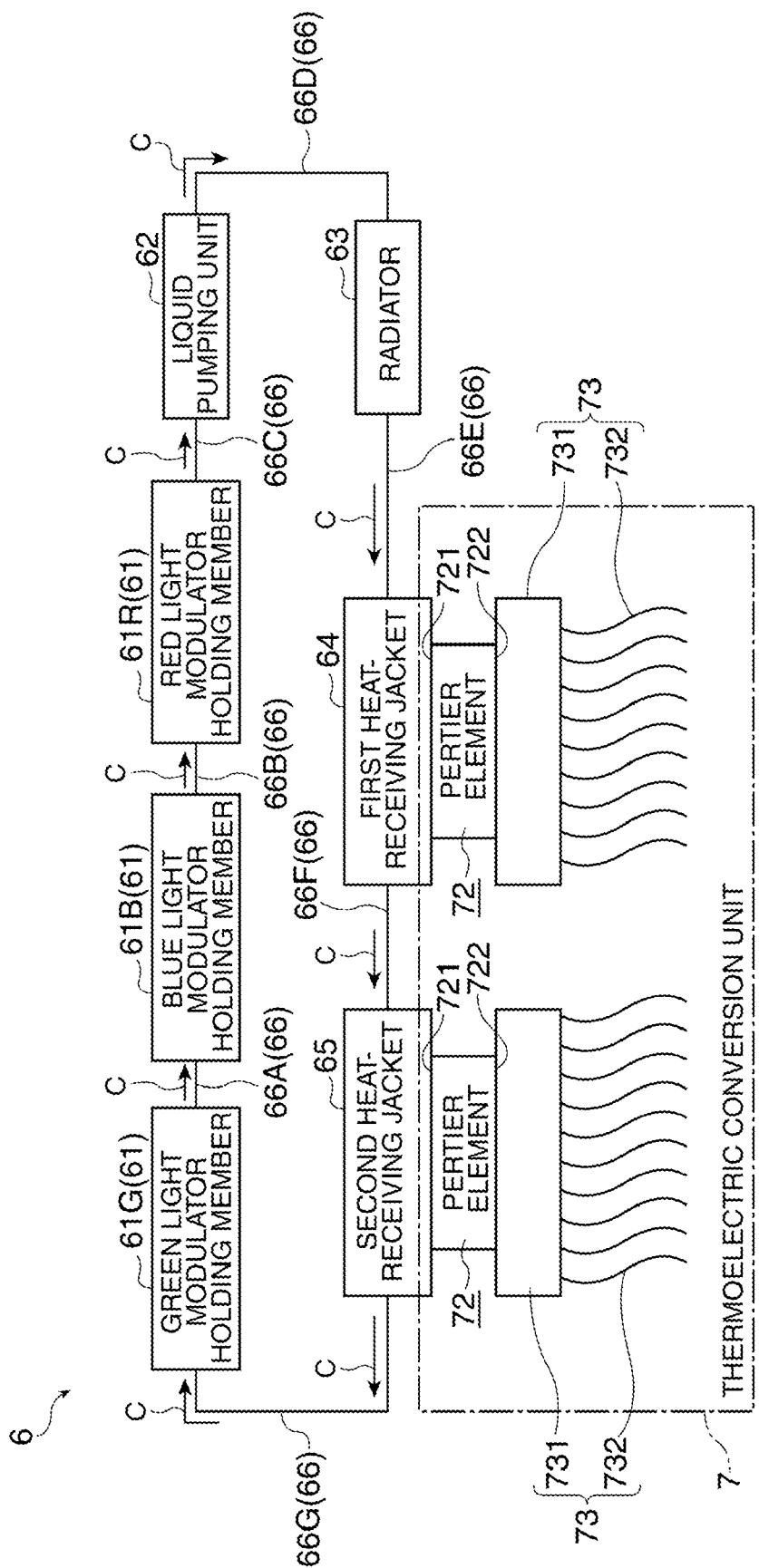
FIG. 14 illustrates the configurations of the liquid-cooling device and the thermoelectric conversion unit according to the first embodiment.

FIG. 14 is a drawing schematically showing the configuration of the liquid-cooling device 6 and the thermoelectric conversion unit 7.

Subsequently, the connecting structure of the respective members 61 to 65 with the liquid circulation members 66 will be described.

In the following description, from among the three optical element holding members 61, an optical element holding member for holding the liquid crystal panel 451R on the red light side is referred to as a red light modulator holding member 61R, an optical element holding member for holding the liquid crystal panel 451G on the green light side is referred to as a green light modulator holding member 61G, and an optical element holding member for holding the liquid crystal panel 451B on the blue light side is referred to as a blue light modulator holding member 61B.

The liquid circulation members 66 are composed of seven members from a first to seventh liquid circulation members 66A to 66G.

Specifically, the first liquid circulation member 66A is connected to one end of the liquid flowing tube 6111 of the green light modulator holding member 61G on the incoming side and is connected to one end of the liquid flowing tube 6111 of the blue light modulator holding member 61B on the outgoing side.

The second liquid circulation member 66B is connected to the other end of the liquid flowing tube 6111 of the blue light modulator holding member 61B on the incoming side and is connected to the other end of the liquid flowing tube 6111 of the red light modulator holding member 61R on the outgoing side.

The third liquid circulation member 66C is connected to the other end of the liquid flowing tube 6111 of the red light modulator holding member 61R on the incoming side and is connected to the liquid pumping unit 62 on the outgoing side.

The fourth liquid circulation member 66D is connected to the liquid pumping unit 62 and the radiator 63 (liquid accumulating portion 631) on the incoming side and the outgoing side, respectively.

The fifth liquid circulation member 66E is connected to the radiator 63 (liquid accumulating portion 632) and the first heat-receiving jacket 64 on the incoming side and the outgoing side, respectively.

The sixth liquid circulation member 66F is connected to the respective heat-receiving jackets 64 and 65 on the incoming side and the outgoing side, respectively.

The seventh liquid circulation member 66G is connected to the second heat-receiving jacket 65 on the incoming side and is connected to the other end of the liquid flowing tube 6111 of the green light modulator holding member 61G on the outgoing side.

With the connecting structure by the liquid circulation members 66 as described above, an annular channel C from the green light modulator holding member 61G through the blue light modulator holding member 61B, the red light modulator holding member 61R, the liquid pumping unit 62, the radiator 63, the first heat-receiving jacket 64, and the second heat-receiving jacket 65 and back again to the green light modulator holding member 61G is established.

Then, the liquid crystal panel 451 is cooled by the liquid-cooling device 6 and the thermoelectric conversion unit 7 as shown above.

In other words, heat generated in the liquid crystal panel 451 is transferred to the cooling liquid via the optical element holding member 61.

The heat transferred to the cooling liquid is transferred to the radiator body 633 when the cooling liquid circulates along the annular channel C and flows in the plurality of flow channels in the radiator 63 (radiator body 633). The heat transferred to the radiator body 633 is discharged from the axial fan 55, and is radiated by the air flowing between the plurality of flow channels.

The heat transferred to the cooling liquid is transferred to the respective heat-receiving jackets 64 and 65 when the cooling liquid circulates along the annular flow channel C and flows in the plurality of fine flow channels Cm of the respective heat-receiving jackets 64 and 65. The heat transferred to the respective heat-receiving jackets 64 and 65 is transferred through the heat transfer route of the respective heat-receiving jackets 64 and 65 through the respective Peltier elements 72, and the respective heat-radiating heat transfer members 73, is discharged from the sirocco fan 75 via the respective fin members 732 and is radiated by air flowing in the cylindrical space defined by the supporting member 71 and the baffle member 74.

The cooling liquid is cooled to a temperature lower than the environmental temperature by heat being radiated step by step by the radiator 63 and the respective heat-receiving jackets 64 and 65.

In the first embodiment described thus far, the following advantages may be achieved.

In the first embodiment, the projector 1 is provided with the Peltier elements 72 connected to the liquid-cooling device 6 in a state in which the heat-absorbing surface 721 is capable of transferring heat from the cooling liquid, heat of the cooling liquid circulating along the annular channel C is effectively absorbed from the heat-absorbing surface 721, thereby effectively lowering the temperature of the cooling liquid. Therefore, the liquid crystal panels 451 are cooled with the cooling liquid at a sufficiently low temperature (environmental temperature or lower), thereby cooling the liquid crystal panels 451 effectively. Therefore, thermal degradation of the liquid crystal panels 451 are avoided, and elongation of the lifetime of the projector 1 is achieved.

Since the cooling efficiency of the liquid crystal panels 451 are improved by using the Peltier elements 72, it is not necessary to employ the liquid pumping unit 62 which has a high pumping property, and the liquid pumping unit 62 which circulates the cooling liquid at a least necessary flow rate may be employed, and hence the flexibility of selection of the liquid pumping unit 62 is improved.

Furthermore, since the cooling liquid is cooled by the Peltier elements 72 after having cooled by the radiator 63, efficient cooling is achieved without increasing the power consumption of the Peltier elements 72.

Since the temperature of the cooling liquid can be effectively reduced using the Peltier elements 72, the radiator 63 of a least necessary dimensions may be employed without increasing the size of the radiator 63, thereby achieving downsizing of the projector 1.

Furthermore, the Peltier elements 72 are connected to the heat-receiving jackets 64 and 65 including the heat exchangers of so-called micro channel or the like including the plurality of fine flow channels Cm in the interior thereof and having a large surface area which comes into contact with the cooling liquid so as to be capable of transferring heat via the heat-absorbing surface 721. Accordingly, heat of the cooling liquid is effectively absorbed from the heat-absorbing surfaces 721 of the Peltier elements 72 via the heat-receiving jackets 64 and 65, and hence the temperature of the cooling liquid is effectively lowered.

The liquid circulation members 66 are connected in series in the annular channel C along the direction of flow of the cooling liquid in the order of the green light modulator holding member 61G, the blue light modulator holding member 61B, and the red light modulator holding member 61R.

Accordingly, for example, it is not necessary to employ the structure in which the incoming side or the outgoing side of the liquid circulation members 66 is bifurcated according to the respective optical element holding members 61 in comparison with the configuration in which the optical element holding members 61 are connected in parallel by the liquid circulation members 66, so that the structure of the liquid circulation members 66 is simplified, and thus the liquid-cooling device 6 is simplified.

By disposing the green light modulator holding member 61G for holding the liquid crystal panel 451G which is subjected to a larger temperature rise than other liquid crystal panels 451R and 451B on the upstream side of the flow channel, and disposing the red light modulator holding member 61R for holding the liquid crystal panel 451R which is subjected to a small temperature rise on the downstream side of the flow channel, the liquid crystal panels are cooled from the liquid crystal panel 451G which is subjected to a larger temperature rise in sequence. Therefore, the respective liquid crystal panels 451 are efficiently cooled while simplifying the liquid-cooling device 6.

Furthermore, the projector 1 includes the air-cooling device 5. Accordingly, by utilizing the air-cooling device 5 in addition to the cooling structure employing the liquid-cooling device 6 and the thermoelectric conversion unit 7, the liquid crystal panel 451 may be effectively cooled even further.

Second Embodiment

Referring now to the drawings, a second embodiment of the disclosure will be described.

In the following description, like numbers reference like configurations and like elements, and detailed description will be omitted or simplified.

Figure 15:
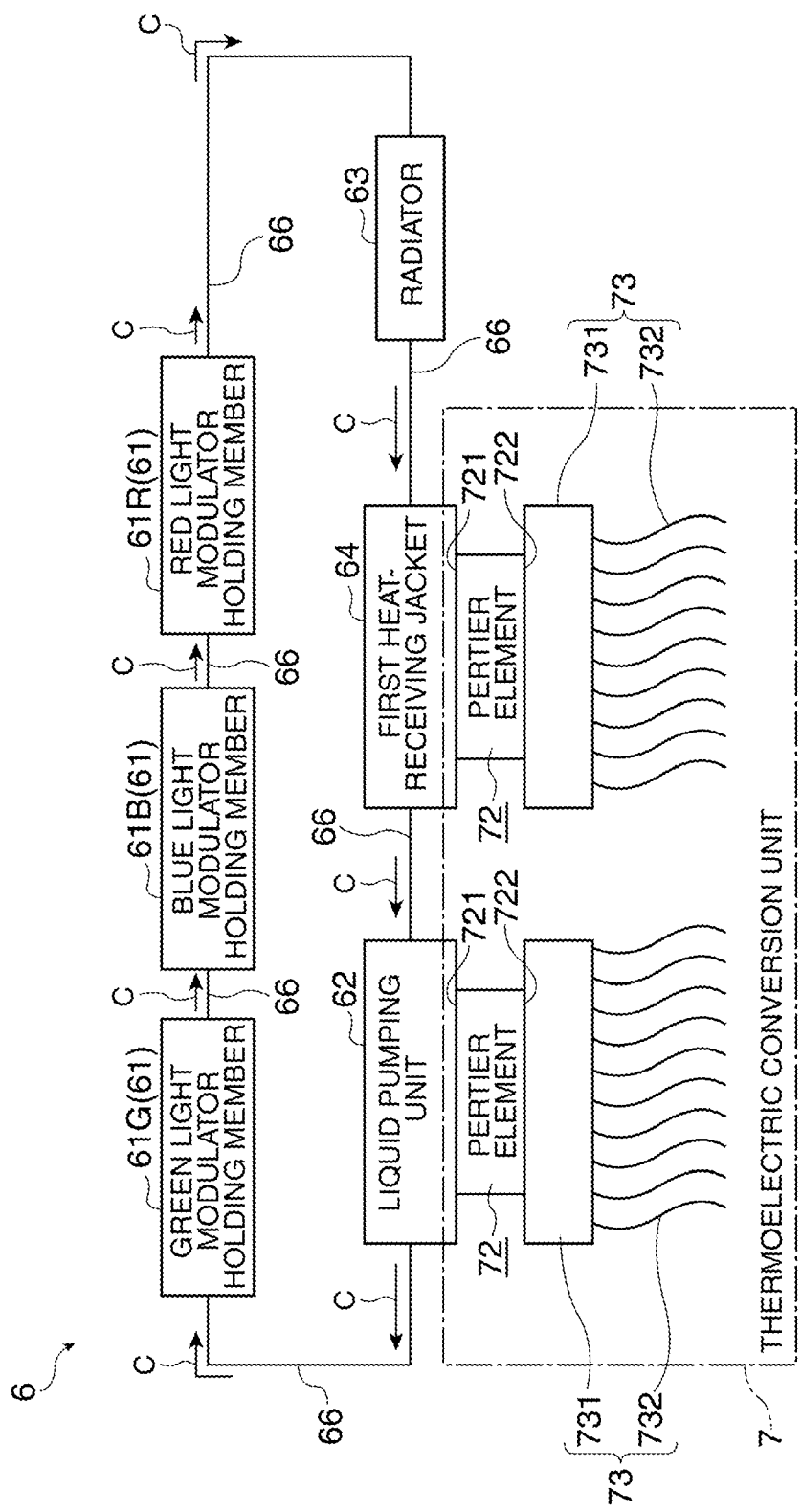
FIG. 15 illustrates the configurations of the liquid-cooling device and the thermoelectric conversion unit according to a second embodiment.

FIG. 15 is a drawing schematically showing the configurations of the liquid-cooling device 6 and the thermoelectric conversion unit 7 according to the second embodiment.

As shown in FIG. 15, the second embodiment is different from the first embodiment only in that the second heat-receiving jacket 65 is omitted and the liquid pumping unit 62 is arranged at a position where the second heat-receiving jacket 65 is located in the first embodiment. Other configurations are the same as the first embodiment.

Specifically, the liquid pumping unit 62 in the second embodiment includes a continuously delivering pump having an impeller arranged in a hollow member formed of heat conducting material such as aluminum.

In the second embodiment, as shown in FIG. 15, the heat-absorbing surfaces 721 of the Peltier elements 72 of the thermoelectric conversion unit 7 is heat-transferably connected to the lower end surface of the liquid pumping unit 62 in addition to the lower end of the first heat-receiving jacket 64.

According to the second embodiment described above, the following advantages may be achieved in addition to certain advantages in the first embodiment.

In the second embodiment, since the heat-absorbing surfaces 721 of the Peltier elements 72 are connected to the liquid pumping unit 62, the cooling liquid after having been absorbed heat by the heat-absorbing surfaces 721 of the Peltier elements 72 via the liquid pumping unit 62 is stirred in the interior of the liquid pumping unit 62. Therefore, it is also possible to reduce the temperature of the cooling liquid in the liquid pumping unit 62 uniformly and hence uniformity of the temperature of the circulating cooling liquid is achieved.

Third Embodiment

Referring now to the drawings, a third embodiment of the disclosure will be described.

In the following description, like numbers reference like configurations and like elements, and detailed description will be omitted or simplified.

Figure 16:
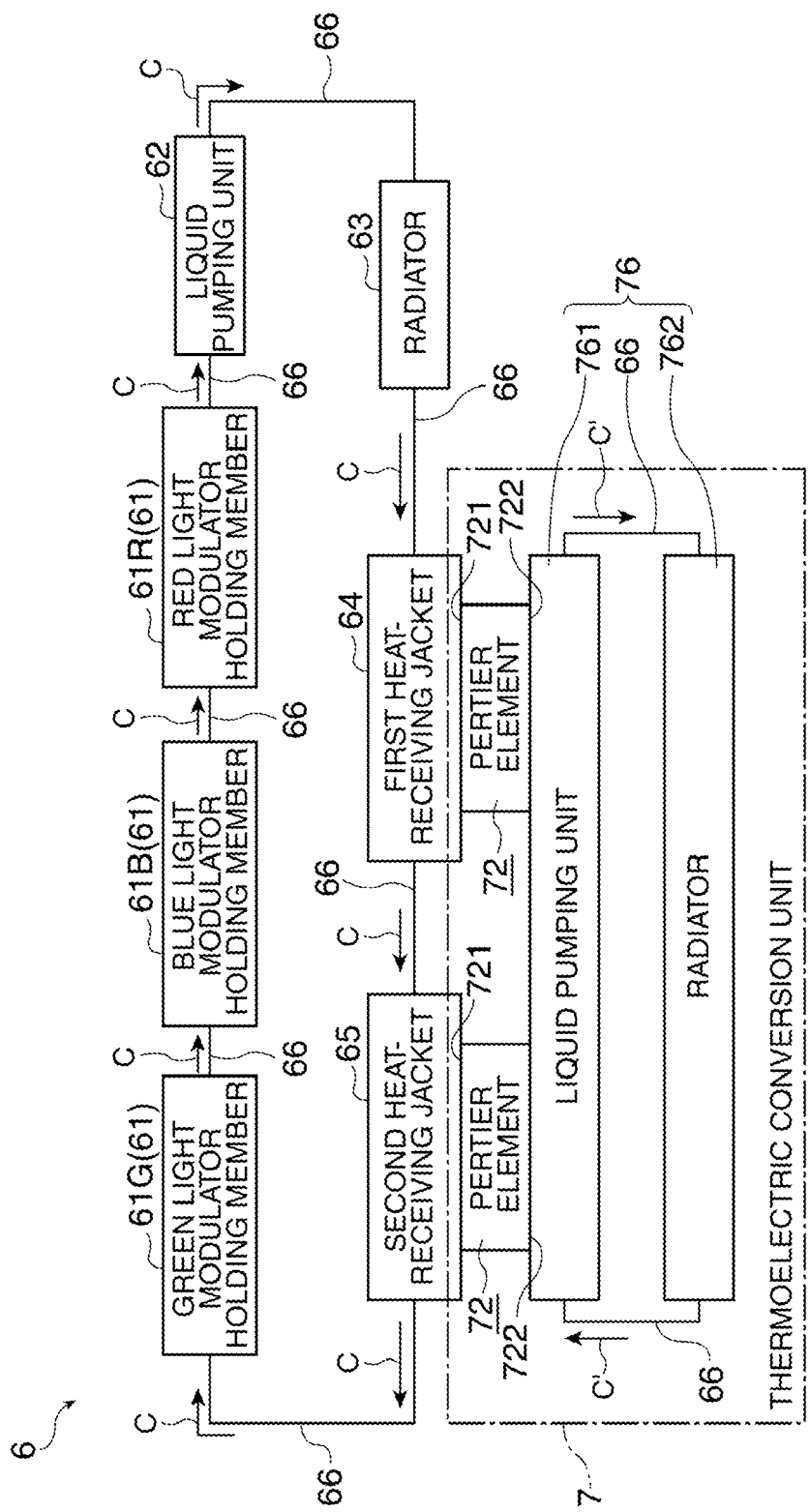
FIG. 16 illustrates the configurations of the liquid-cooling device and the thermoelectric conversion unit according to a third embodiment.

FIG. 16 is a drawing schematically showing the configurations of the liquid-cooling device 6 and the thermoelectric conversion unit 7 according to the third embodiment.

In the third embodiment, the heat-radiating heat transfer members 73, the baffle member 74, and the sirocco fan 75 are omitted from the thermoelectric conversion unit 7 and, as shown in FIG. 16, a second liquid-cooling device 76 is provided. Other configurations are the same as the first embodiment.

The second liquid-cooling device 76 includes a liquid pumping unit 761 and a radiator 762 connected by the plurality of liquid circulation members 66 to form an annular channel C'.

Here, the liquid pumping unit 761 is similar to the liquid pumping unit 62 described in the second embodiment, and is heat-transferably connected to the heat-radiating surfaces 722 of the respective Peltier elements 72.

The radiator 762 is similar to the radiator 63 which constitutes the liquid-cooling device 6.

In other words, in the third embodiment, heat transferred through the heat transfer route from the respective heat-receiving jackets 64 and 65 to the Peltier elements 72 is transferred to the liquid pumping unit 761. Then, the heat transferred to the liquid pumping unit 761 is transferred to the cooling liquid such as water or ethylene glycol which circulates along the annular channel C' and is radiated when flowing in the radiator 762.

According to the third embodiment described above, the following advantages may be achieved in addition to certain advantages in the first and/or second embodiments.

In the third embodiment, the thermoelectric conversion unit 7 includes the second liquid-cooling device 76. Accordingly, in comparison with the configuration described in the first embodiment, effective heat radiation from the heat-radiating surfaces 722 of the Peltier elements 72 may be achieved, and improvement of the ratio of amount of the heat absorption (endoergic ratio) of the heat absorption from the cooling object (the heat-receiving jackets 64 and 65) with respect to the power consumption of the Peltier elements may be achieved. As such, further lowering of the temperature of the circulating cooling liquid may be achieved.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. For example, in embodiments described above, the liquid-cooling device 6 is provided with the radiator 63. However, the disclosure is not limited thereto, and a configuration in which the radiator 63 is omitted may sufficiently achieve certain advantages.

In embodiments described above, the heat-absorbing surfaces 721 of the Peltier elements 72 are heat-transferably connected to the heat-receiving jackets 64 and 65 and the liquid pumping unit 62. However, heat-transferable connections to other members, for example, to the members 61, 63 and 66 may also be acceptable as long as the heat-absorbing surfaces 721 are connected so as to be capable of transferring heat from the cooling liquid.

In embodiments described above, four Peltier elements 72 are provided. However, the number of the Peltier elements 72 is not limited thereto, and only one Peltier element is also applicable. The same is applicable to the heat-receiving jackets 64 and 65 and the heat-radiating heat transfer members 73.

In embodiments described above, the liquid crystal panel 451 is employed as the optical element to be cooled. However, the disclosure is not limited thereto, and other optical elements such as the light source 41, the polarization conversion element 424, the incident-side deflection plates 452, and the outgoing-side deflection plates 453 may be employed as the object to be cooled.

In embodiments described above, the configuration of the air-cooling device 5 is not limited to the configuration described. For example, in embodiments above, the pair of sirocco fans 52 and 53 are employed. However, an axial fan may also be employed as well.

In embodiments shown above, the optical element holding members 61 are connected in series in the order of the green light modulator holding member 61G, the blue light modulator holding member 61B, and the red light modulator holding member 61R along the direction of flow of the cooling liquid by the first to third liquid circulation members 66A to 66C. However, the order of connection is not limited thereto.

For example, a connection in the order of the blue light modulator holding member 61B, the green light modulator holding member 61G, and the red light modulator holding member 61R in series along the direction of flow of the cooling liquid is also applicable.

In addition to the configuration in which the respective light modulator holding members 61R, 61G, and 61B are connected in series, a configuration in which the respective light modulator holding members 61R, 61G, and 61B are connected in parallel is also included. Therefore, for example, a configuration in which the blue light modulator holding member 61B and the red light modulator holding member 61R are connected in series along the direction of flow of the cooling liquid, and the blue light modulator holding member 61B and the red light modulator holding member 61R are connected in parallel with the green light modulator holding member 61G is also possible.

In embodiments described above, the light source 41 is not limited to the configuration described in the embodiments and may include various solid light-emitting elements such as a laser diode, an LED (Light Emitting Diode), an organic EL (Electro Luminescence) element, and a silicon light-emitting element.

In embodiments shown above, the projector 1 is described as a three-plate type projector having the three liquid crystal panels 451. However, the disclosure is not limited thereto, and a single-plate projector having a single liquid crystal panel is also applicable. Also, a projector having two liquid crystal panels, or a projector having four or more liquid crystal panels is applicable.

In embodiments described above, the light-transmissive liquid crystal panel in which the light-incoming surface and the light-outgoing surface are different is employed. However, a reflective liquid crystal panel in which the light-incoming surface and the light-outgoing surface are the same may also be employed.

In embodiments described above, the liquid crystal panel is employed as the light modulator. However, light modulators other than the liquid crystal such as devices employing a micro mirror are also applicable.

In embodiments described above, only an example of the front-type projector which projects images from the direction of observing the screen has been described. However, this disclosure is also applicable to a rear-type projector which projects images in the direction opposite from the direction of observing the screen.

This disclosure may be applied to projectors used for presentation or in a home theater since the optical elements are effectively cooled.

This disclosure is intended to cover any adaptations or variations of the embodiments discussed herein. Therefore, it is manifestly intended that embodiments in accordance with the present disclosure be limited only by the claims and the equivalents thereof.

What is claimed is:
1. A projector comprising:
an optical element holding member configured to allow a flow of a cooling liquid therein and to hold the optical element so as to transfer heat to the cooling liquid;
a liquid pumping unit configured to circulate the cooling liquid;
a plurality of liquid circulation members configured to connect the optical element holding member and the liquid pumping unit and to define a flow channel of the cooling liquid;
a heat-receiving jacket disposed in the flow channel and having a plurality of flow channels which allow flow of the cooling liquid therein;
a heat transfer member;
a thermoelectric conversion element having a heat-absorbing surface connected to the heat-receiving jacket and a heat-radiating surface connected to the heat transfer member;
a supporting member configured to fix the heat-receiving jacket and the heat transfer member;
a baffle member configured to define an internal space with the supporting member and to house the heat transfer member in the internal space; and
a first cooling fan configured to provide cooling air to the heat transfer member disposed in the internal space,
wherein the supporting member includes an opening to fit the thermoelectric conversion element.

2. The projector according to claim 1, wherein
the heat-receiving jacket includes a first heat-receiving jacket and a second heat-receiving jacket,
the heat transfer member includes a first heat transfer member and a second heat transfer member,
the thermoelectric conversion element includes:
    a first thermoelectric conversion element having the heat-absorbing surface connected to the first heat-receiving jacket and the heat-radiating surface connected to the first heat transfer member, and
    a second thermoelectric conversion element having the heat-absorbing surface connected to the first heat-receiving jacket and the heat-radiating surface connected to the first heat transfer member;
the first cooling fan provides the cooling air to the first heat transfer member and the second heat transfer member,
the first heat-receiving jacket and the second heat-receiving jacket are disposed so that the cooling liquid flows through the first heat-receiving jacket and then flows through the second heat-receiving jacket, and
the second heat transfer member is disposed on upstream side of the first heat transfer member in a providing direction of the cooling air from the first cooling fan.

3. The projector according to claim 2, further comprising:
a radiator having flow channels which allow flow of the cooling liquid therein and configured to radiate heat of the cooling liquid; and
a second cooling fan configured to provide cooling air to the radiator,
wherein the radiator is disposed on upstream side of the first heat-receiving jacket in the flow channel in which the cooling liquid circulates.

4. The projector according to claim 3, further comprising an outer casing configuring an outer shell, wherein
the outer casing has an air-exhaust port configured to discharge air to outside, and
the radiator is disposed so as to oppose to the air-exhaust port.

5. The projector according to claim 4, wherein
the second cooling fan is disposed so as to oppose to the air-exhaust port with intermediary of the radiator, and
the second cooling fan is an axial fan and discharges taken cooling air toward the radiator.

6. The projector according to claim 2,
wherein the optical element holding member is disposed on downstream side of the second heat-receiving jacket in the flow channel in which the cooling liquid circulates.

7. The projector according to claim 1, wherein
the supporting member is formed of a material having a coefficient of thermal conductivity not higher than 0.9 W/(m·K), and
the opening of the supporting member covers a peripheral edge of the thermoelectric conversion element.

8. The projector according to claim 1, wherein
the heat-receiving jacket includes a first heat-receiving jacket and a second heat-receiving jacket,
the heat transfer member includes a first heat transfer member and a second heat transfer member,
the thermoelectric conversion element includes:
    a first thermoelectric conversion element having the heat-absorbing surface connected to the first heat-receiving jacket and the heat-radiating surface connected to the first heat transfer member, and
    a second thermoelectric conversion element having the heat-absorbing surface connected to the first heat-receiving jacket and the heat-radiating surface connected to the first heat transfer member, and
the first heat transfer member and the second heat transfer member are disposed in series along a providing direction of the cooling air from the first cooling fan and have a plurality of fin members disposed along the providing direction.

9. The projector according to claim 1, wherein:
the optical element includes a red light modulator, a green light modulator, and a blue light modulator which modulate a red light, a green light, and a blue light, respectively, according to image data,
the optical element holding member includes a red light modulator holding member, a green light modulator holding member, and a blue light modulator holding member corresponding to the red light modulator, the green light modulator, and the blue light modulator, and
the liquid circulation members connect the red light modulator holding member, the green light modulator holding member, and the blue light modulator holding member in series in the flow channel.

10. The projector according to claim 1, further comprising a second cooling fan to deliver cooling air to the optical element.

11. The projector according to claim 10, wherein the second cooling fan is a sirocco fan.

12. The projector according to claim 1, wherein the thermoelectric conversion element is a Peltier element.

13. The projector according to claim 1, wherein the optical element is a liquid crystal panel.

14. A projector comprising:
an optical element holding member configured to allow a flow of a cooling liquid therein and to hold the optical element so as to transfer heat to the cooling liquid;
a liquid pumping unit configured to circulate the cooling liquid;
a plurality of liquid circulation members configured to connect the optical element holding member and the liquid pumping unit and to define a flow channel of the cooling liquid;
a heat-receiving jacket disposed in the flow channel and having a plurality of flow channels which allow flow of the cooling liquid therein;
a heat transfer member;
a thermoelectric conversion element having a heat-absorbing surface connected to the heat-receiving jacket and a heat-radiating surface connected to the heat transfer member;
a supporting member configured to fix the heat-receiving jacket and the heat transfer member;
a baffle member configured to define an internal space with the supporting member and to house the heat transfer member in the internal space; and
a first cooling fan configured to provide cooling air to the heat transfer member disposed in the internal space,
wherein
the heat-receiving jacket includes a first heat-receiving jacket and a second heat-receiving jacket,
the heat transfer member includes a first heat transfer member and a second heat transfer member,
the thermoelectric conversion element includes:
    a first thermoelectric conversion element having the heat-absorbing surface connected to the first heat-receiving jacket and the heat-radiating surface connected to the first heat transfer member, and
    a second thermoelectric conversion element having the heat-absorbing surface connected to the first heat-receiving jacket and the heat-radiating surface connected to the first heat transfer member, the first cooling fan provides the cooling air to the first heat transfer member and the second heat transfer member, the first heat-receiving jacket and the second heat-receiving jacket are disposed so that the cooling liquid flows through the first heat-receiving jacket and then flows through the second heat-receiving jacket, and the second heat transfer member is disposed on upstream side of the first heat transfer member in a providing direction of the cooling air from the first cooling fan.

15. The projector according to claim 14, further comprising:
a radiator having flow channels which allow flow of the cooling liquid therein and configured to radiate heat of the cooling liquid; and
a second cooling fan configured to provide cooling air to the radiator,
wherein the radiator is disposed on upstream side of the first heat-receiving jacket in the flow channel in which the cooling liquid circulates.

16. The projector according to claim 15, further comprising an outer casing configuring an outer shell, wherein
the outer casing has an air-exhaust port configured to discharge air to outside, and
the radiator is disposed so as to oppose to the air-exhaust port.

17. The projector according to claim 16, wherein
the second cooling fan is disposed so as to oppose to the air-exhaust port with intermediary of the radiator, and
the second cooling fan is an axial fan and discharges taken cooling air toward the radiator.

18. The projector according to claim 14,
wherein the optical element holding member is disposed on downstream side of the second heat-receiving jacket in the flow channel in which the cooling liquid circulates.

19. A projector comprising:
an optical element holding member configured to allow a flow of a cooling liquid therein and to hold the optical element so as to transfer heat to the cooling liquid;
a liquid pumping unit configured to circulate the cooling liquid;
a plurality of liquid circulation members configured to connect the optical element holding member and the liquid pumping unit and to define a flow channel of the cooling liquid;
a heat-receiving jacket disposed in the flow channel and having a plurality of flow channels which allow flow of the cooling liquid therein;
a heat transfer member;
a thermoelectric conversion element having a heat-absorbing surface connected to the heat-receiving jacket and a heat-radiating surface connected to the heat transfer member;
a supporting member configured to fix the heat-receiving jacket and the heat transfer member;
a baffle member configured to define an internal space with the supporting member and to house the heat transfer member in the internal space; and
a first cooling fan configured to provide cooling air to the heat transfer member disposed in the internal space,
wherein
the heat-receiving jacket includes a first heat-receiving jacket and a second heat-receiving jacket,
the heat transfer member includes a first heat transfer member and a second heat transfer member,
the thermoelectric conversion element includes:
a first thermoelectric conversion element having the heat-absorbing surface connected to the first heat-receiving jacket and the heat-radiating surface connected to the first heat transfer member, and
a second thermoelectric conversion element having the heat-absorbing surface connected to the first heat-receiving jacket and the heat-radiating surface connected to the first heat transfer member, and
the first heat transfer member and the second heat transfer member are disposed in series along a providing direction of the cooling air from the first cooling fan and have a plurality of fin members disposed along the providing direction.

* * * * *